US009325140B2

(12) United States Patent
Purnawirman et al.

(10) Patent No.: US 9,325,140 B2
(45) Date of Patent: Apr. 26, 2016

(54) PHOTONIC DEVICES AND METHODS OF USING AND MAKING PHOTONIC DEVICES

(71) Applicants: Purnawirman Purnawirman, Watertown, MA (US); Michael R. Watts, Hingham, MA (US); Ehsan Shah Hosseini, Medford, MA (US); Jonathan D. B. Bradley, Boston, MA (US); Jie Sun, Cambridge, MA (US); Matteo Cherchi, Espoo (FI)

(72) Inventors: Purnawirman Purnawirman, Watertown, MA (US); Michael R. Watts, Hingham, MA (US); Ehsan Shah Hosseini, Medford, MA (US); Jonathan D. B. Bradley, Boston, MA (US); Jie Sun, Cambridge, MA (US); Matteo Cherchi, Espoo (FI)

(73) Assignee: Massachusetts Institute of Technology, Cambridge, MA (US)

( * ) Notice: Subject to any disclaimer, the term of this patent is extended or adjusted under 35 U.S.C. 154(b) by 0 days.

(21) Appl. No.: 14/200,427

(22) Filed: Mar. 7, 2014

(65) Prior Publication Data

US 2014/0269800 A1    Sep. 18, 2014

Related U.S. Application Data

(60) Provisional application No. 61/783,981, filed on Mar. 14, 2013.

(51) Int. Cl.
| | |
|---|---|
| *H01S 3/063* | (2006.01) |
| *H01S 3/17* | (2006.01) |
| *H01S 3/08* | (2006.01) |
| *H01S 3/083* | (2006.01) |
| *H01S 3/094* | (2006.01) |
| *H01S 3/16* | (2006.01) |

(Continued)

(52) U.S. Cl.
CPC ............. *H01S 3/0632* (2013.01); *H01S 3/0635* (2013.01); *H01S 3/17* (2013.01); *H01S 3/083* (2013.01); *H01S 3/08059* (2013.01); *H01S 3/094096* (2013.01); *H01S 3/1053* (2013.01); *H01S 3/1608* (2013.01); *H01S 3/2308* (2013.01)

(58) Field of Classification Search
CPC ..... H01S 3/063; H01S 3/0632; H01S 3/0635; H01S 3/0637; H01S 3/17; H01S 3/1636; H01S 3/1608
See application file for complete search history.

(56) References Cited

U.S. PATENT DOCUMENTS

| | | | | |
|---|---|---|---|---|
| 5,119,460 A | * | 6/1992 | Bruce et al. .................... | 385/142 |
| 5,200,029 A | * | 4/1993 | Bruce et al. ...................... | 216/24 |

(Continued)

OTHER PUBLICATIONS

Bauters et al., "Ultra-Low-Loss High-Aspect-Ratio Si3N4 Waveguides," Feb. 3, 2011, Optics Express, vol. 19, No. 4, 3163-3174.*

(Continued)

*Primary Examiner* — Joshua King
(74) *Attorney, Agent, or Firm* — Cooley LLP

(57) ABSTRACT

Examples of the present invention include integrated erbium-doped waveguide lasers designed for silicon photonic systems. In some examples, these lasers include laser cavities defined by distributed Bragg reflectors (DBRs) formed in silicon nitride-based waveguides. These DBRs may include grating features defined by wafer-scale immersion lithography, with an upper layer of erbium-doped aluminum oxide deposited as the final step in the fabrication process. The resulting inverted ridge-waveguide yields high optical intensity overlap with the active medium for both the 980 nm pump (89%) and 1.5 μm laser (87%) wavelengths with a pump-laser intensity overlap of over 93%. The output powers can be 5 mW or higher and show lasing at widely-spaced wavelengths within both the C- and L-bands of the erbium gain spectrum (1536, 1561 and 1596 nm).

11 Claims, 33 Drawing Sheets

(51) Int. Cl.
*H01S 3/23* (2006.01)
*H01S 3/105* (2006.01)

(56) References Cited

U.S. PATENT DOCUMENTS

| | | | |
|---|---|---|---|
| 5,249,195 A | | 9/1993 | Feldman et al. |
| 5,360,982 A * | | 11/1994 | Venhuizen ............... 385/14 |
| 5,381,262 A * | | 1/1995 | Arima et al. ............. 359/341.1 |
| 5,563,979 A * | | 10/1996 | Bruce et al. .................. 385/142 |
| 6,160,824 A | | 12/2000 | Meissner et al. |
| 6,533,907 B2 | | 3/2003 | Demaray et al. |
| 6,625,366 B2 | | 9/2003 | Ruschin et al. |
| 6,884,327 B2 | | 4/2005 | Pan et al. |
| 7,127,147 B2 | | 10/2006 | Gunn et al. |
| 7,142,759 B2 | | 11/2006 | Heideman et al. |
| 7,146,087 B2 | | 12/2006 | Heideman et al. |
| 7,292,745 B2 | | 11/2007 | Dabby |
| 7,343,054 B1 | | 3/2008 | Lee et al. |
| 7,528,403 B1 | | 5/2009 | Borselli et al. |
| 7,826,702 B2 | | 11/2010 | Dawes |
| 7,847,353 B2 | | 12/2010 | Hill et al. |
| 8,288,290 B2 | | 10/2012 | Carothers |
| 2002/0024981 A1 | | 2/2002 | Tojo et al. |
| 2002/0085270 A1* | | 7/2002 | Bendett ..................... 359/343 |
| 2002/0146047 A1* | | 10/2002 | Bendett et al. ............... 372/40 |
| 2003/0012230 A1 | | 1/2003 | Hopkins et al. |
| 2004/0114847 A1* | | 6/2004 | Fischer et al. ..................... 385/5 |
| 2005/0063426 A1* | | 3/2005 | Sparacin et al. ................. 372/6 |
| 2008/0002929 A1* | | 1/2008 | Bowers et al. .................. 385/15 |
| 2008/0137695 A1* | | 6/2008 | Takahashi et al. .............. 372/19 |
| 2008/0144161 A1 | | 6/2008 | Zhou et al. |
| 2008/0181279 A1* | | 7/2008 | Burgi et al. .................... 372/108 |
| 2008/0198888 A1* | | 8/2008 | Arimoto ................... 372/45.011 |
| 2009/0245298 A1* | | 10/2009 | Sysak et al. ..................... 372/22 |
| 2010/0142580 A1* | | 6/2010 | Gilet et al. ................ 372/50.11 |
| 2010/0246617 A1* | | 9/2010 | Jones ............................... 372/26 |
| 2011/0222570 A1* | | 9/2011 | Junesand et al. ............. 372/50.1 |
| 2011/0299561 A1* | | 12/2011 | Akiyama ................... 372/50.11 |
| 2012/0099817 A1 | | 4/2012 | Quan et al. |
| 2012/0153864 A1 | | 6/2012 | Snyman |
| 2013/0272646 A1* | | 10/2013 | Fish et al. ....................... 385/14 |

OTHER PUBLICATIONS

Notification of Transmittal of the International Search Report and the Written Opinion of the International Search Authority in related PCT Application No. PCT/US14/22067 mailed Nov. 28, 2014, 15 pages.

Agazzi, L. et al., "Impact of luminescence quenching on relaxation-oscillation frequency in solid-state lasers," Applied Physics Letters, vol. 100, pp. 011109-1-011109-3, (2012).

Agrawal, G., "Noise in semiconductor lasers and its impact on optical communication systems," SPIE, Laser Noise, vol. 1376, pp. 224-235, (1990).

Barmenkov, Y. et al., "Pump noise as the source self-modulation and self-pulsing in Erbium fiber laser", Optics Express, vol. 12, No. 14, pp. 3171-3177, (2004).

Belt, M. et al., "Arrayed narrow linewidth erbium-doped waveguide-distributed feedback lasers on an ultra-low-loss silicon-nitride platform," Optics Letters, vol. 38, No. 22, pp. 4825-4827 (Nov. 15, 2013).

Bernhardi, E. H. et al., "Ultra-narrow-linewidth, single-frequency distributed feedback waveguide laser in $Al_2O_3:Er^{3+}$ on silicon", Optics Letters, vol. 35, No. 14, pp. 2394-2396, (2010).

Bowers, J. et al., "Hybrid Silicon Lasers: The Final Frontier to Integrated Computing," OPN Optics & Photonics News, pp. 28-33, (May 2010).

Boyraz, O. et al., "Demonstration of a silicon Raman laser," Optics Express, vol. 12, No. 21, pp. 5269-5273, (2004).

Bradley, J. D. B., et al., "Integrated $Al_2O_3:Er^{3+}$ ring lasers on silicon with wide wavelength selectivity", Optics Letters, vol. 35, No. 1, pp. 73-75, Jan. 2010.

Bradley, J. D. B, et al., "Gain bandwidth of 80 nm and 2 dB/cm peak gain in $Al_2O_3:Er^{3+}$ optical amplifiers", J. Opt. Soc. Am. B, vol. 27, No. 2, pp. 187-196, Feb. 2010.

Camacho-Aguilera, R. E., et al., "An electrically pumped germanium laser," Optics Express, vol. 20, pp. 11316-11320, (2012).

Chen, H. et al., "Suppression of self-pulsing behavior in erbium-doped fiber lasers with a semiconductor optical amplifier," Applied Optics 41, pp. 3511-3516, (2002).

Colin, S. et al., "Evidence of a saturable-absorption effect in heavily erbium-doped fibers," Optics Letters, vol. 21, No. 24, pp. 1987-1989, (1996).

Hastings, J. T. et al., "Optical waveguides with apodized sidewall gratings via spatial-phase-locked electron-beam lithography," Journal of Vacuum Science and Technology B, vol. 20, No. 6, pp. 2753-2757, (2002).

Keyvaninia, S. et al., "Demonstration of a heterogeneously integrated III-V/SOI single wavelength tunable laser," Optics Express, vol. 21, No. 3, pp. 3784-3792 (2013).

Kitagawa, T. et al., "Guided-Wave Based on Erbium-Doped Silica Planar Lightwave Circuit", Electronic Letters, vol. 27, No. 4, p. 334-335, (1991).

Laporta, P. et al., "Erbium-ytterbium microlasers: optical properties and lasing characteristics", Optical Materials, vol. 11, p. 269-288, (1999).

Luo, L. et al., "Suppression of self-pulsing in an erbium-doped fiber laser," Optics Letters, vol. 22, No. 15, pp. 1174-1176, (1997).

Marchena, E. et al., "Integrated Tunable CMOS Laser for Si Photonics," OFC/NFOEC Post deadline Papers, 3 pages, (2013).

Murphy, T. E. et al., "Fabrication and Characterization of Narrow-Band Bragg-Reflection Filters in Silicon-on-Insulator Ridge Waveguides," IEEE Journal of Lightwave Technology, pp. 1938-1942, (2001).

Park, H. et al., "Hybrid silicon evanescent laser fabricated with a silicon waveguide and III-V offset quantum wells", Optics Express, vol. 13, No. 23, pp. 9460-9464, (2005).

Purnawirman, P. et al., "C- and L-band erbium-doped waveguide lasers with wafer-scale silicon nitride cavities," Optics Letters, vol. 38, Issue 11, pp. 1760-1762 (May 20, 2013).

Sherwood-Droz, N. et al., "Scalable 3D dense integration of photonics on bulk silicon," Optics Express, vol. 19, No. 18, pp. 17758-17765, (2011).

Srinivasan, S. et al., "Design of phase-shifted hybrid silicon distributed feedback lasers," Optics Express, vol. 19, No. 2, pp. 9255-9261, (2011).

Sun, J. et al., "Phase-Shift Bragg Grating in Silicon Using Equivalent Phase-Shift Method," IEEE Photonics Technology Letters, vol. 24, No. 1, pp. 25-27, (2012).

Suzuki, A. et al., "An Ultralow Noise and Narrow Linewidth $\lambda/4$-Shifted DFB Er-Doped Fiber Laser With a Ring Cavity Configuration", IEEE Photonics Technology Letters, vol. 19, No. 19, pp. 1463-1465, (2007).

Tien, P. K., "Light Waves in Thin Films and Integrated Optics", Applied Optics, vol. 10, No. 11, p. 2395-2413, (1971).

Utaka, K. et al., "$\lambda/4$-shifted InGaAsP/InP DFB Lasers", IEEE Journal of Quantum Electronics, vol. QE-22, No. 7, pp. 1042-1051, (1986).

Worhoff, K. et al., "Reliable Low-Cost Fabrication of Low-Loss $Al_2O_3:Er^{3+}$ Waveguides With 5.4-dB Optical Gain," IEEE Journal of Quantum Electronics, vol. 45, No. 5, pp. 454-461, (2009).

Yan, Y. C. et al., "Erbium-doped phosphate glass waveguide on silicon with 4.1 dB/cm gain at 1.535 µm,", Applied Physics Letters, vol. 71, No. 22, p. 2922-2924, (1997).

* cited by examiner

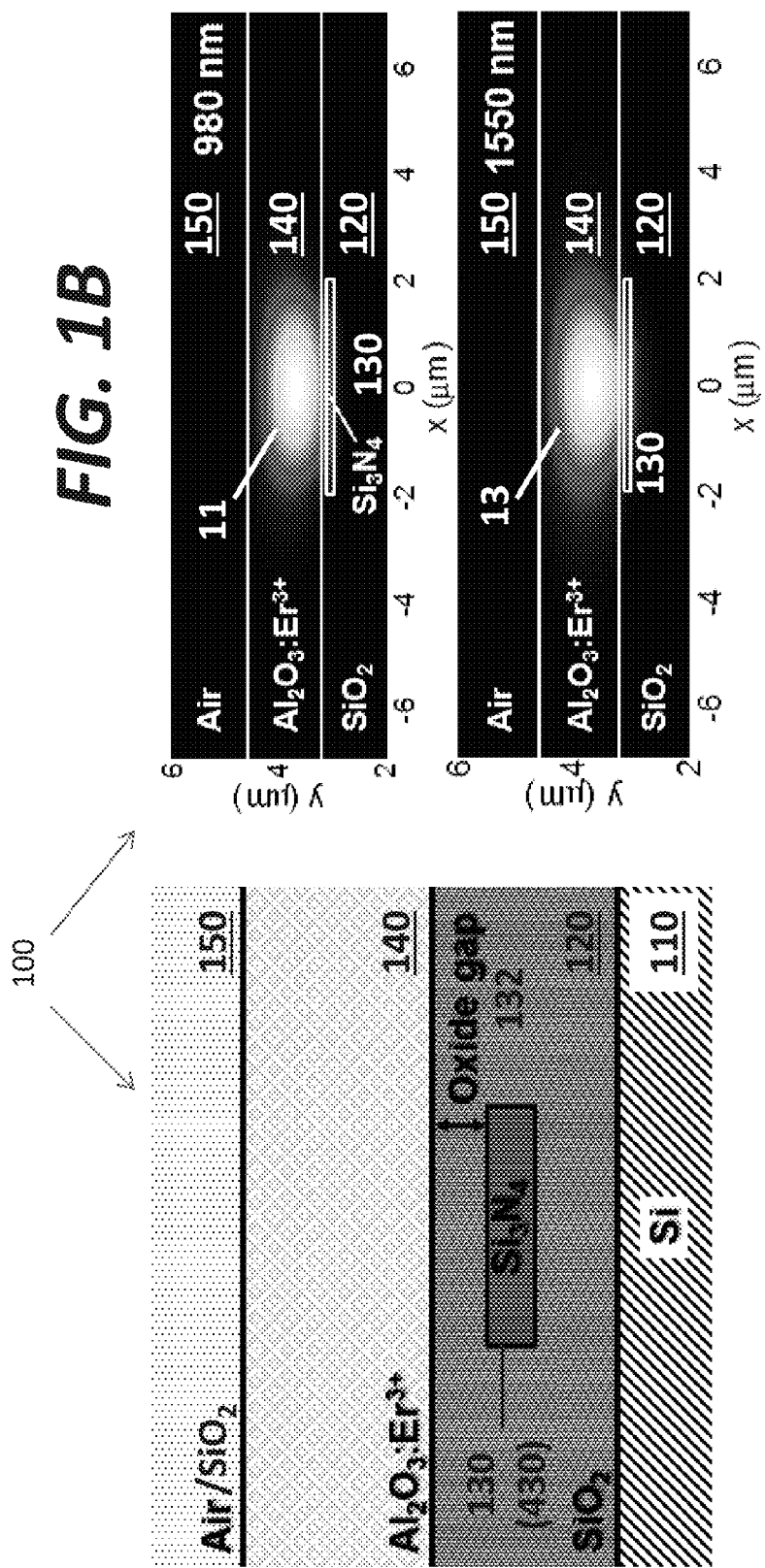

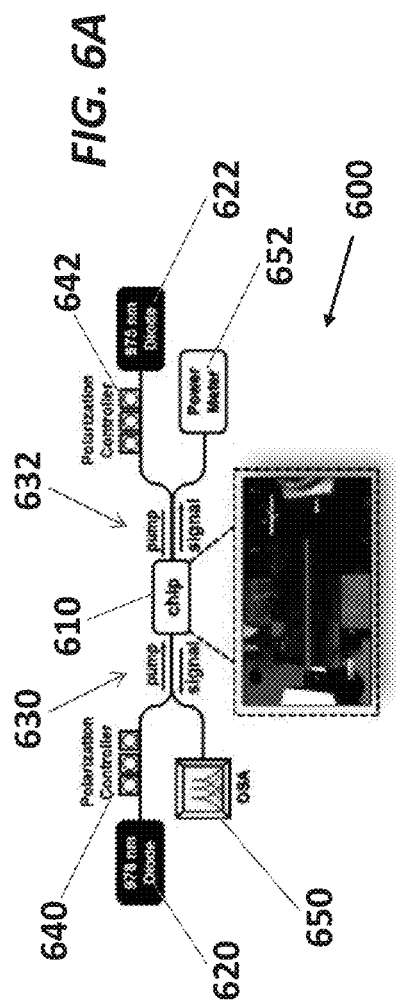
*FIG. 6A*
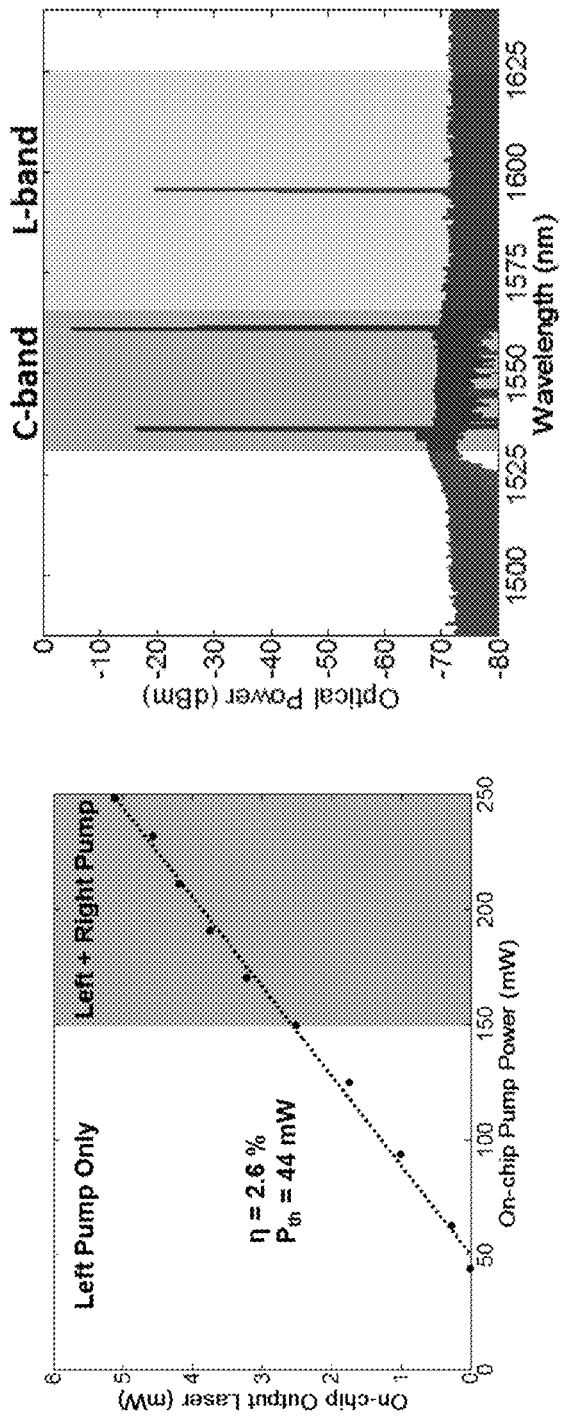
*FIG. 6B*
*FIG. 6C*

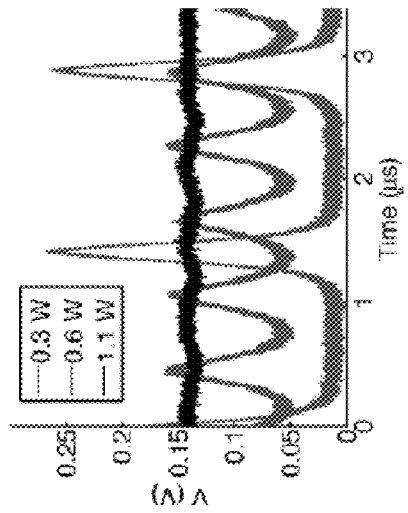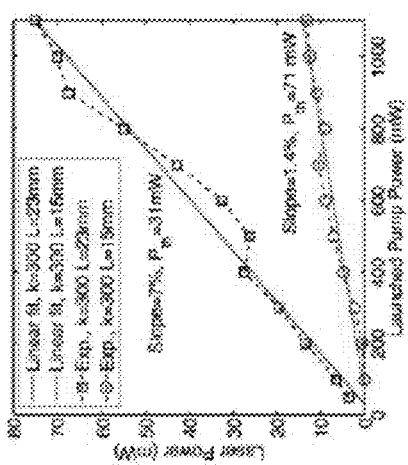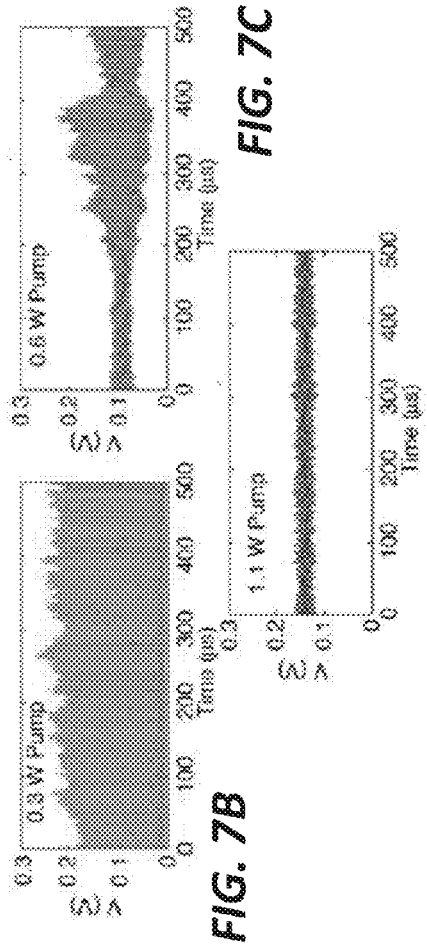
FIG. 7A
FIG. 7C
FIG. 7D
FIG. 6D
FIG. 7B

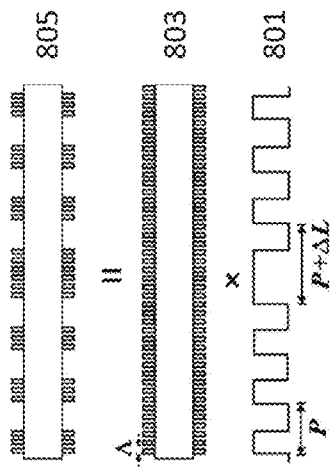
FIG. 8A
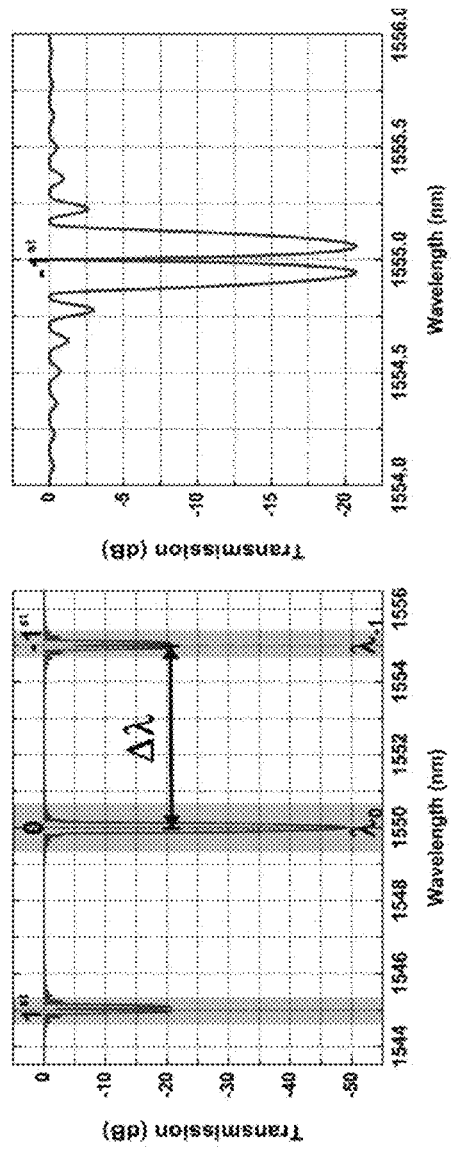
FIG. 8C
FIG. 8B

Laser Cross Section

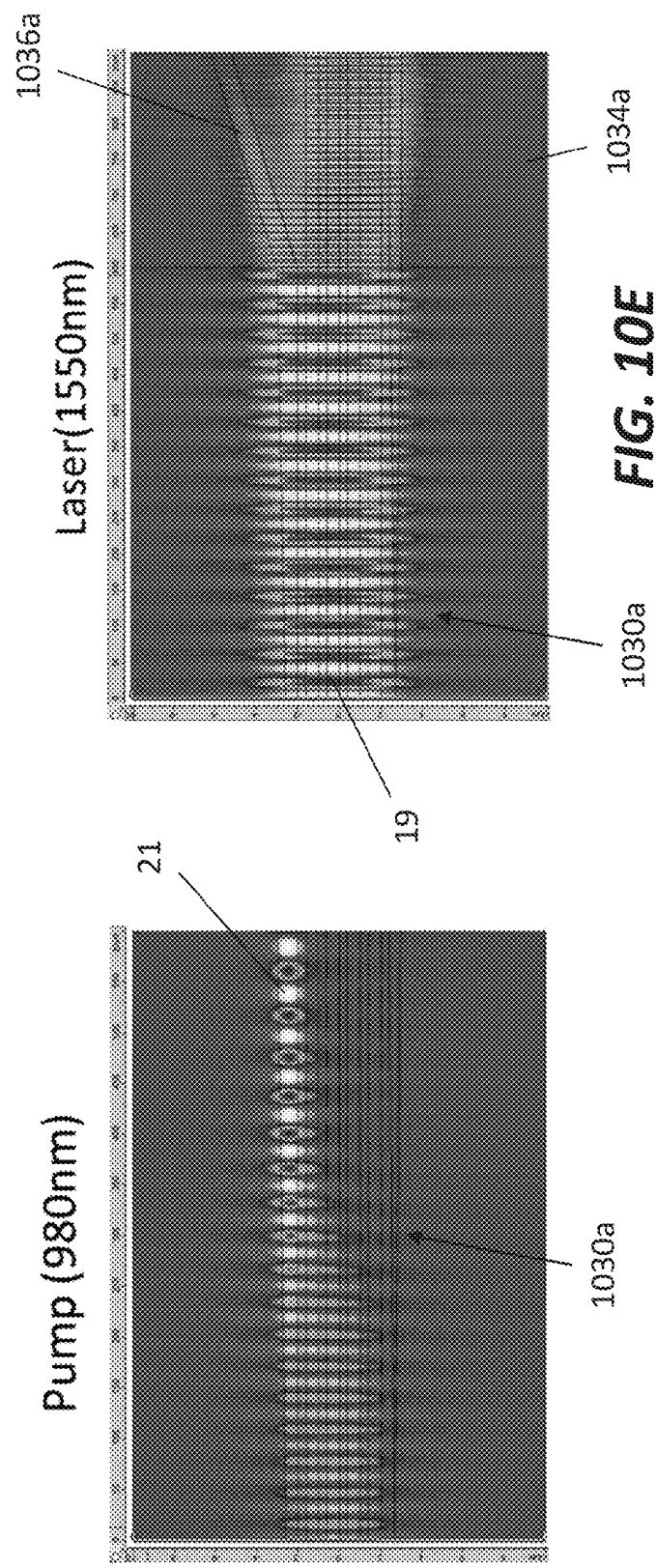

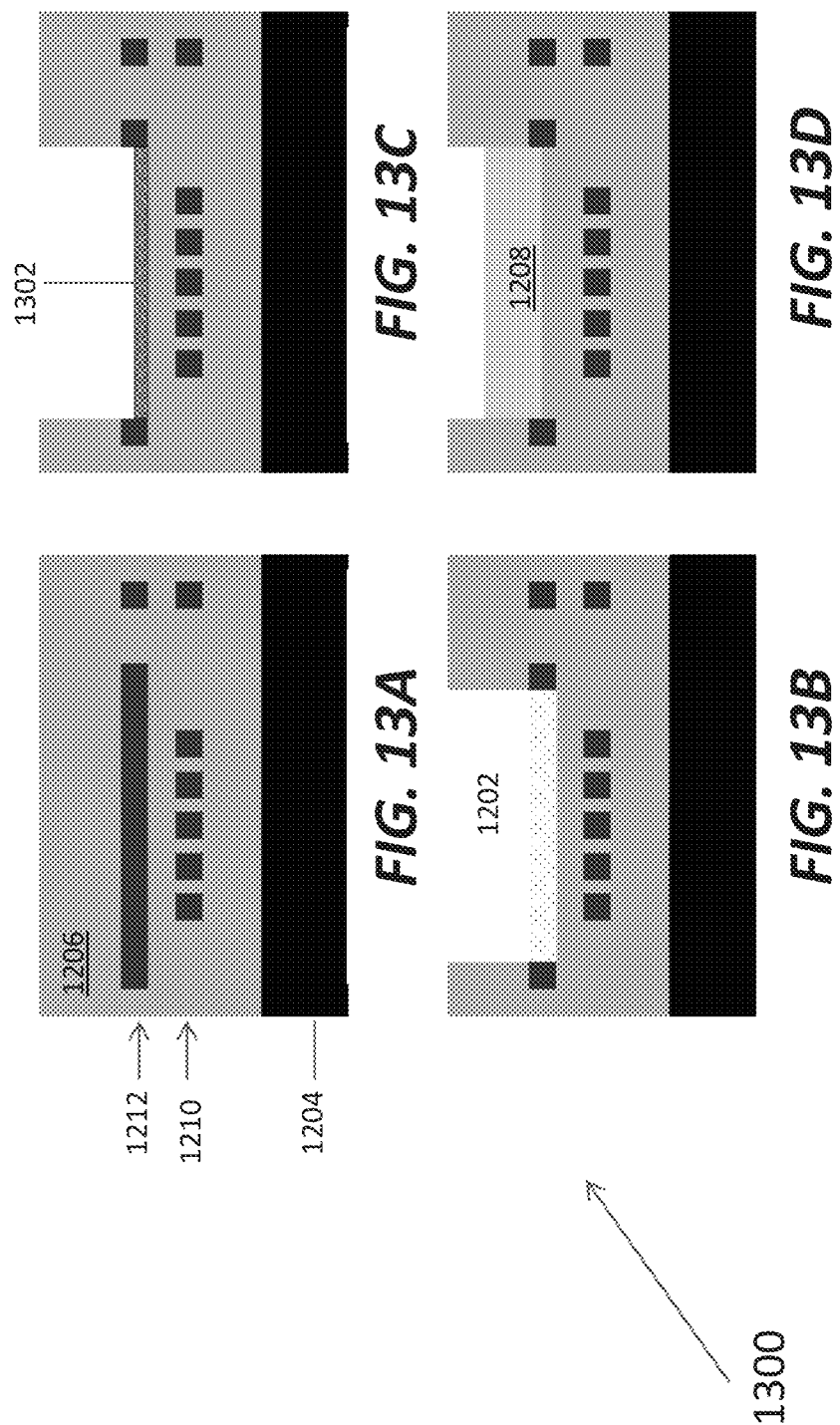

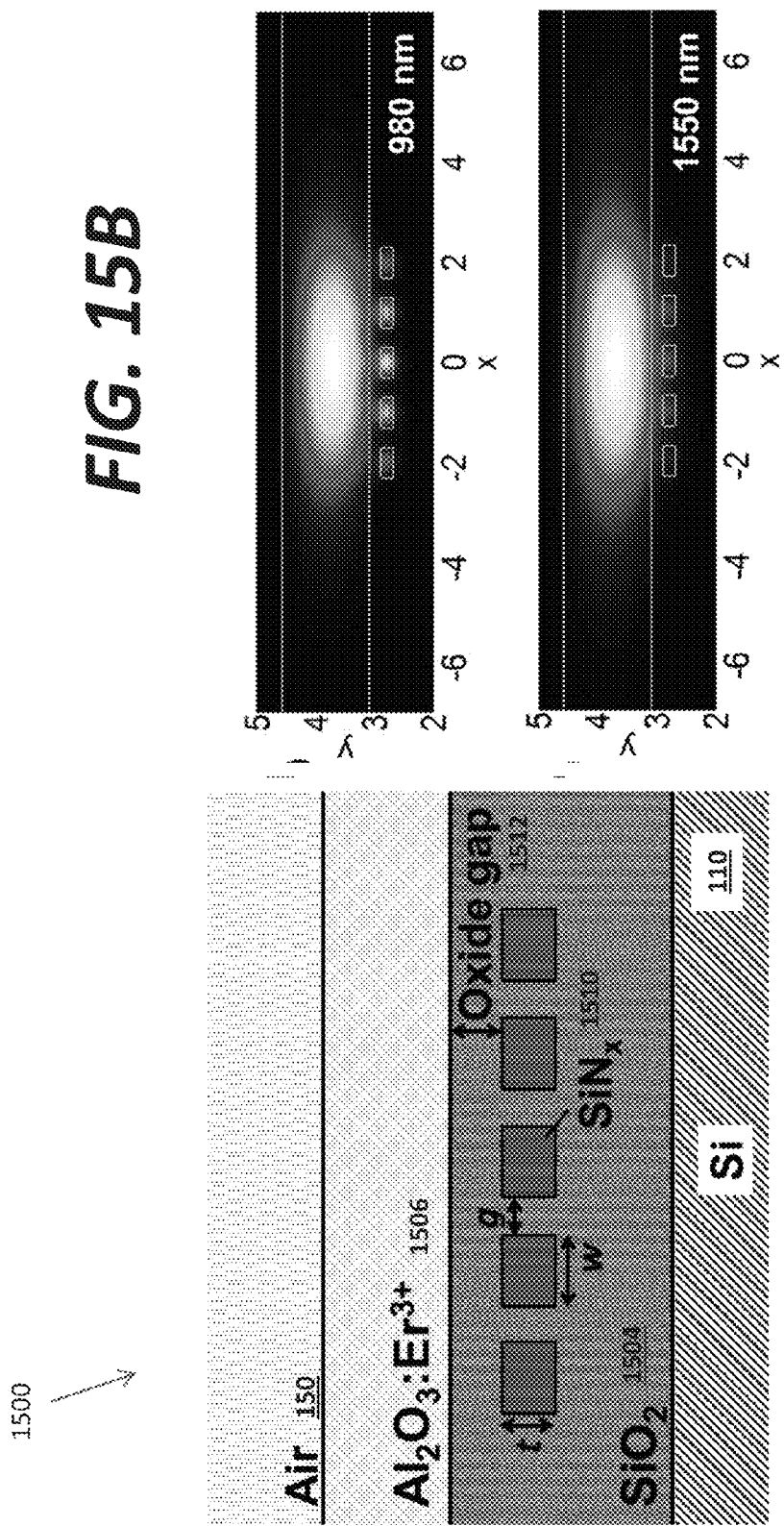

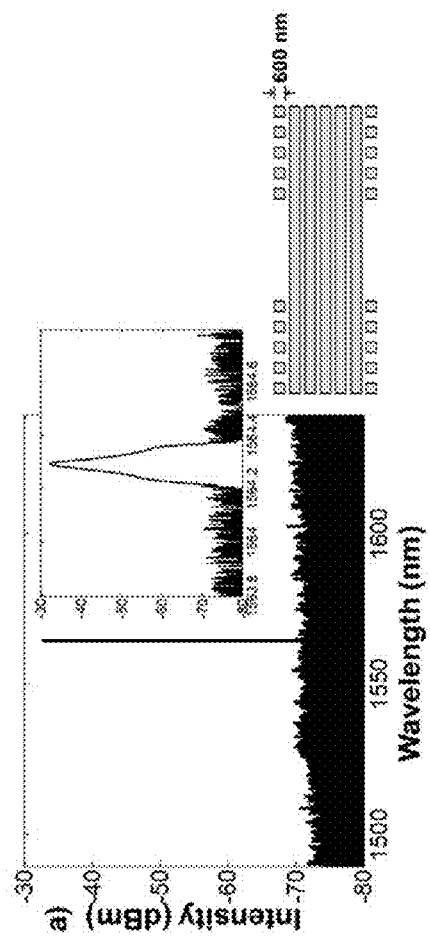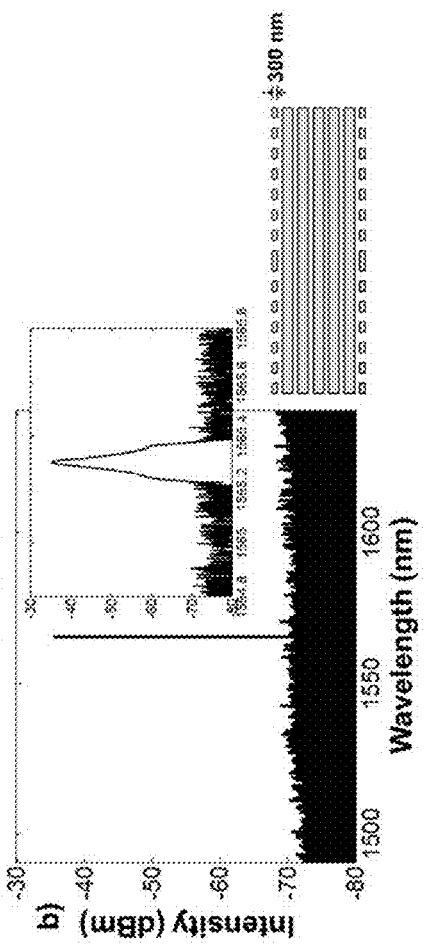

PHOTONIC DEVICES AND METHODS OF USING AND MAKING PHOTONIC DEVICES

CROSS-REFERENCE TO RELATED PATENT APPLICATION

This application claims priority, under 35 U.S.C. §119(e), from U.S. Provisional Application 61/783,981, filed Mar. 14, 2013, entitled "Integrated Erbium Laser for Silicon Photonics," which application is hereby incorporated herein by reference in its entirety.

GOVERNMENT SUPPORT

This invention was made with government support under Contract No. HR0011-12-2-0007 awarded by the Defense Advanced Research Projects Agency and under Contract No. W911NF-12-1-0210 awarded by the Army Research Office. The government has certain rights in the invention.

BACKGROUND

On-chip lasers that exhibit efficiency, low noise, stability are useful for a number of important applications ranging from integrated analog photonics and microwave generation to coherent communications and laser detection and ranging (LADAR). Integrated lasers can be realized via Germanium-on-Silicon heterojunctions, hybrid integration with III-V semiconductor materials, stimulated Raman scattering, and erbium-doped glass on silicon. Unfortunately, germanium lasers exhibit large threshold currents, relatively low internal quality factors, and broad spectral linewidth. Despite demonstrating high efficiency lasing with electrical pumping, III-V semiconductor heterojunction lasers tend to exhibit broad linewidth and corresponding high phase noise levels due to their limited internal quality factors and large thermo-optic coefficients. Moreover, integration of III-V chips or wafers to silicon is a complicated fabrication process that can lead to low yields.

Erbium-doped glass lasers can be made using a straightforward, monolithic fabrication process that yields high-performance, narrow-linewidth lasers. In particular, erbium-doped aluminum oxide ($Al_2O_3$:$Er^{3+}$) has been co-sputtered onto oxidized silicon wafers with relatively low loss and a broad gain spectrum to form racetrack and ultra-narrow-linewidth distributed feedback (DFB) lasers. But the laser waveguides and cavities in previous erbium-doped glass lasers have been made using interference lithography and by etching the gain material, both of which are difficult to incorporate within standard wafer-scale silicon photonics process flows.

It is also difficult to fabricate erbium-doped glass DFB lasers with phase-shifted gratings using interference lithography and gain material etching. Typically, laser diodes have integrated quarter-wave phase-shifted Bragg gratings to ensure single wavelength lasing for both long-haul fiber-optic telecommunications and short-reach on-chip data communications. Furthermore, in the DFB laser arrays used for wavelength division multiplexing (WDM), the DFB lasers in the array have gratings that are phase-shifted by precise amounts to ensure that their output wavelengths are aligned with the channels on the WDM wavelength grid. In the telecommunications C-band, these channels are normally several nanometers apart, which corresponds to picometer-scale variations in the grating spacings. Unfortunately, picometer-scale variations are difficult to achieve using photolithography.

SUMMARY

Embodiments of the present invention include a photonic device (and methods of using a photonic device), such as a laser or optical amplifier, that comprises a substrate, a dielectric layer, at least one dielectric strip, and a gain layer. The a dielectric layer is disposed on the substrate and has a first refractive index. The dielectric strip is disposed within the dielectric layer and has a second refractive index that is greater than the first refractive index. And the gain layer is disposed on the dielectric layer and has a third refractive index greater than the first refractive index. In operation, the gain layer guides an optical pump beam and an optical signal beam in a propagation direction parallel to a longitudinal axis of the dielectric strip so as to amplify the optical signal beam via stimulated emission.

Embodiments of the present invention also include methods of making photonic devices. In one example, the method includes depositing dielectric material having a first refractive index on a substrate to form a dielectric layer having an upper surface. Next, at least one dielectric strip with a second refractive index greater than the first refractive index is formed within the dielectric layer about 0 nm to about 500 nm from the upper surface. Gain material with a third refractive index greater than the first refractive index is deposited on at least a portion of the upper surface of the dielectric layer over the dielectric strip to form a gain layer that guides an optical pump beam and an optical signal beam along a longitudinal axis of the dielectric strip.

It should be appreciated that all combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein. It should also be appreciated that terminology explicitly employed herein that also may appear in any disclosure incorporated by reference should be accorded a meaning most consistent with the particular concepts disclosed herein.

BRIEF DESCRIPTION OF THE DRAWINGS

The skilled artisan will understand that the drawings primarily are for illustrative purposes and are not intended to limit the scope of the inventive subject matter described herein. The drawings are not necessarily to scale; in some instances, various aspects of the inventive subject matter disclosed herein may be shown exaggerated or enlarged in the drawings to facilitate an understanding of different features. In the drawings, like reference characters generally refer to like features (e.g., functionally similar and/or structurally similar elements).

FIG. 1A is a cross-section of an optical waveguide formed by a strip of silicon nitride deposited in a silicon dioxide layer between a layer of erbium-doped aluminum oxide and above a silicon substrate.

FIG. 1B is a simulation of the optical waveguide shown in FIG. 1A guiding coherent light at a wavelength of 980 nm.

FIG. 1C is a simulation of the optical waveguide shown in FIG. 1A guiding coherent light at a wavelength of 1550 nm.

FIG. 6A is a diagram of a system for characterizing photonic devices like the laser shown in FIG. 4A.

FIG. 6B is a plot of the on-chip output power versus the on-chip pump power for a laser like the one shown in FIG. 4A measured using the system of FIG. 6A.

FIG. 6C is a plot of the emission spectrum of the laser of FIG. 6B in the telecommunications C- and L-bands measured using the system of FIG. 6A FIG. 6D is a plot of laser power versus launched pump power for distributed feedback (DFB) gratings with lengths of 23 mm (upper curve) and 15 mm (lower curve).

FIG. 7A is a plot of laser output power versus time for pump powers of 0.3 W (bottom curve), 0.6 W (middle curve), and 1.1 W (upper curve).

FIG. 7B shows a close-up plot of the laser output power versus time for a pump power of 0.3 W.

FIG. 7C shows a close-up plot of the laser output power versus time for a pump power of 0.6 W.

FIG. 7D shows a close-up plot of the laser output power versus time for a pump power of 1.1 W.

FIG. 8A is a schematic diagram of an equivalent phase shift (EPS) grating (top) produced by modulating a periodic grating (middle) with quasi-periodic modulation function (bottom).

FIG. 8B is a plot of a simulated transmission spectrum of the EPS grating of FIG. 8A.

FIG. 8C is a close-up view of the −1 order shown in FIG. 8B.

FIG. 10D is a simulation of pump beam coupling in the pump region shown in FIG. 10C.

FIG. 10E is a simulation of the laser output beam coupling in the pump region shown in FIG. 10C.

FIGS. 13A-13D illustrate a process of fabricating the integrated photonics platform shown in FIG. 12.

FIG. 15A shows a cross-sectional schematic of a multi-segmented waveguide for an Er:Al$_2$O$_3$ laser.

FIGS. 15B and 15C show the intensity distributions is the multi-segmented waveguide in FIG. 15A for a pump wavelength at 980 nm and a signal wavelength at 1550 nm, respectively.

FIGS. 17A and 17B show the transmission spectra and structures of DBR and DFB lasers, respectively, at a wavelength of about 1565 nm.

DETAILED DESCRIPTION

Figure 2A:
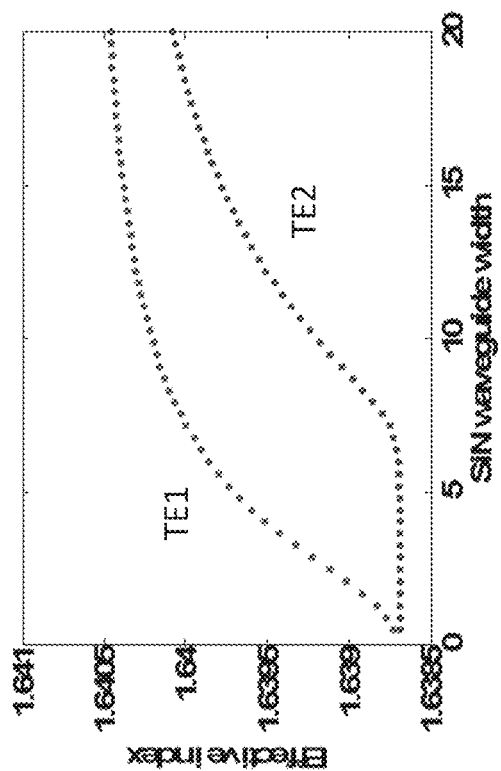
FIGS. 2A and 2B are plots of the effective index versus the width of the silicon nitride strip shown in FIG. 1A at wavelengths of 1550 nm and 980 nm, respectively.

Rare earth doped glasses lasers offer versatile, low cost, and reliable light amplification and generation for microwave photonics, wavelength division multiplexed (WDM) communications, and sensing and imaging applications. To date, however, it has not been possible to pattern rare-earth-doped materials into waveguides or laser cavities using standard silicon processing techniques, including complementary metal-oxide-semiconductor (CMOS) techniques. Embodiments of the present invention address this limitation by providing erbium-doped lasers and other active photonic devices with waveguides and gratings defined by thin strips of silicon nitride ($Si_3N_4$) covered by a layer of erbium-doped aluminum oxide ($Al_2O_3$:$Er^{3+}$). In operation, the silicon nitride strips guide light within the erbium-doped aluminum oxide layer as explained in greater detail below.

Because these active photonic devices use patterned silicon nitride, which is compatible with CMOS processing, instead of patterned erbium-doped material, they can be produced on silicon wafers using standard CMOS processes. For example, the silicon nitride strips can be etched or patterned to form tapered regions, bent regions, and gratings, including gratings that define cavities for distributed feedback (DFB) lasers and distributed Bragg resonator (DBR) lasers. Once the silicon nitride strips have been deposited, etched, and buried in silicon oxide, the erbium-doped glass can be deposited as a back-end process step without any further etching or processing. Because the erbium-doped glass is deposited as a back-end process step instead of an in-process step, this approach enables large-scale production of erbium-doped waveguide lasers and integration with silicon nitride passive components on silicon photonic chips.

High Refractive Index Dielectric Strips for Erbium-Doped Waveguides

FIG. 1A shows the cross section of an exemplary photonic device 100 formed using standard CMOS processing and back-end deposition of an erbium-doped glass layer. The photonic device 100 comprises a silicon substrate 110 coated with a silicon dioxide layer 120, which has a refractive index of about 1.44 at a wavelength of 1500 nm and a thickness of about 1.0 µm to about 6.0 µm. The silicon dioxide layer 120 encapsulates a silicon nitride strip 130, which has a thickness of about 100 nm and a width of about 250 nm to about 30 µm (e.g., a width of about 500 nm, 1.0 µm, 1.5 µm, 2.0 µm, 2.5 µm, 3.0 µm, 4.0 µm, 5.0 µm, 7.5 µm, 10 µm, 12.5 µm, 15 µm, 20 µm, or 25 µm). Expressed in terms of the pump wavelength, the strip width may be about $\lambda_p/4$ to about $20\lambda_p$. The silicon nitride strip 130, which is also known as an inverted ridge, runs through the silicon dioxide layer 120 a short distance below a gain layer 140, which has a thickness of about 1.4 µm and could be up to 10.0 µm thick. This distance, shown in FIG. 1A as an oxide gap 132, is about 0 nm to about 500 nm, or about $\lambda_p/2$ in terms of the pump wavelength. In this example, the gain layer 140 is exposed to air 150, but it can also be coated with silicon dioxide or another suitable dielectric material.

The gain layer 140 may comprise any suitable material, including glass or dielectric material doped with rare-earth ions (e.g., $SiO_2$:$Er^{3+}$), III-V semiconductor materials, and even certain polymers. In this example, the gain layer 140 comprises aluminum oxide doped with erbium at a concentration of about $1.4\times10^{20}$ $cm^{-3}$ to about $3\times10^{20}$ $cm^{-3}$. Among rare-earth atoms compatible with CMOS processing, erbium is a quasi-three level system that can be pumped at 1480 nm, lases in the 1530-1610 nm range, and can be hosted by a variety of glasses. For example, phosphate glass yields high gain for on-chip devices, and enhanced deposition techniques and control over film stoichiometry make metal-oxide films desirable. In this example, erbium is hosted in aluminum oxide, which can be co-sputtered relatively easily and accepts erbium ions without clustering. Aluminum oxide exhibits relatively low loss and a high refractive index (n=1.58-1.65 at 1550 nm) at near-infrared wavelengths.

Although the erbium-doped aluminum oxide layer 140 has a relatively high refractive index at near-infrared wavelengths, the silicon nitride strip 130 has an even higher refractive index in the same region of the spectrum. At 1550 nm, for example, the refractive index of silicon nitride is about 1.99. Because the silicon nitride strip 130 has such a high refractive index, it tends to confine the intensity distribution of the fundamental transverse-electrical (TE) mode, especially at shorter wavelengths, including the 980 nm wavelength used to pump erbium-based lasers and optical amplifiers. Unfortunately, confining the pump beam in the silicon nitride strip 130 instead of in the gain layer 140 reduces the overlap between the pump beam and any signal beam propagating in the gain layer 140, which in turn limits the amplification of the signal beam. Furthermore, confining optical intensity in the silicon nitride strip 130 may introduce detrimental intracavity losses from scattering and the intrinsic absorption of the silicon nitride.

Separating the silicon nitride strip 130 from the gain layer 140 with a thin region of silicon dioxide—the oxide gap 132 shown in FIG. 1A—reduces the guiding effect of the high refractive index silicon nitride strip 130 and increases the confinement within the gain layer 140. As a result, the pump beam and the signal beam propagate through the gain layer 140 along a path just above the silicon nitride strip 130. In other words, the pump beam and the signal beam propagate in a direction parallel to silicon nitride strip's longitudinal axis (i.e., the z axis in the frame of reference of FIG. 1A).

FIGS. 1B and 1C show simulated intensity distributions 11 and 13 of the fundamental TE mode at wavelengths of 980 nm and 1550 nm, respectively, in the photonic device 100 of FIG. 1A. In both cases, the fundamental TE mode 11, 13 is confined to overlapping regions of the gain layer 140 just above the silicon nitride strip 130. The intensity confinement factor ($\gamma_{s/p}$) and intensity overlap ($\Gamma_{sp}$) can be quantified according to the following equations:

$$\gamma_{s/p} = \frac{\int_A I_{s/p} \, dA}{\int_\infty I_{s/p} \, dA} = \frac{\sum_{active(ij)} I_{ij}^{(s/p)}}{\sum_{ij} I_{ij}^{(s/p)}} \quad (1)$$

$$\Gamma_{sp} = \frac{\int_A I_p I_s \, dA}{\sqrt{\int_\infty I_p^2 \, dA \int_\infty I_s^2 \, dA}} = \frac{\sum_{active(ij)} I_{ij}^{(p)} I_{ij}^{(s)}}{\sqrt{\sum_{ij} I_{ij}^{(2p)}} \sqrt{\sum_{ij} I_{ij}^{(2s)}}} \quad (2)$$

For the simulations in FIGS. 1B and 1C, Equations (1) and (2) yield $\gamma_s$=87%, $\gamma_p$=89%, and $\Gamma_{sp}$=93%. The large intensity overlap between the fundamental TE modes leads to higher gain and more efficient amplification of the signal beam. In addition, the intensity confinement factors are relatively insensitive to wavelength, permitting resonant pumping around 1480 nm or pumping near 980 nm, where co-doping the gain layer 140 with ytterbium can improve performance.

Figure 2B:
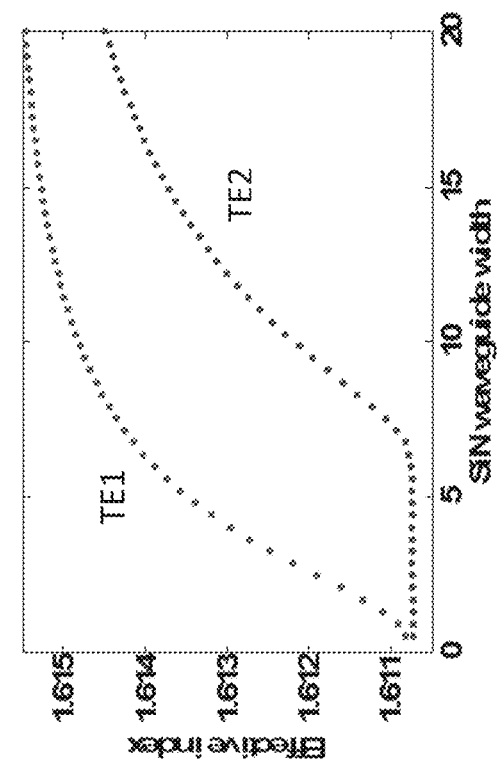

FIGS. 2A and 2B are plots of the waveguide's effective index versus the width of the silicon nitride strip at wavelengths of 1550 nm and 980 nm, respectively. The upper curve in each plot represents the TE1 mode and the lower plot in each plot represents the TE2 mode. These plots show that the signal and pump beams have similar waveguide width cutoff conditions for single TE-mode operation.

Amplifiers and Lasers in Erbium-Doped Gain Layers Over Silicon Nitride Strips

Figure 3A:
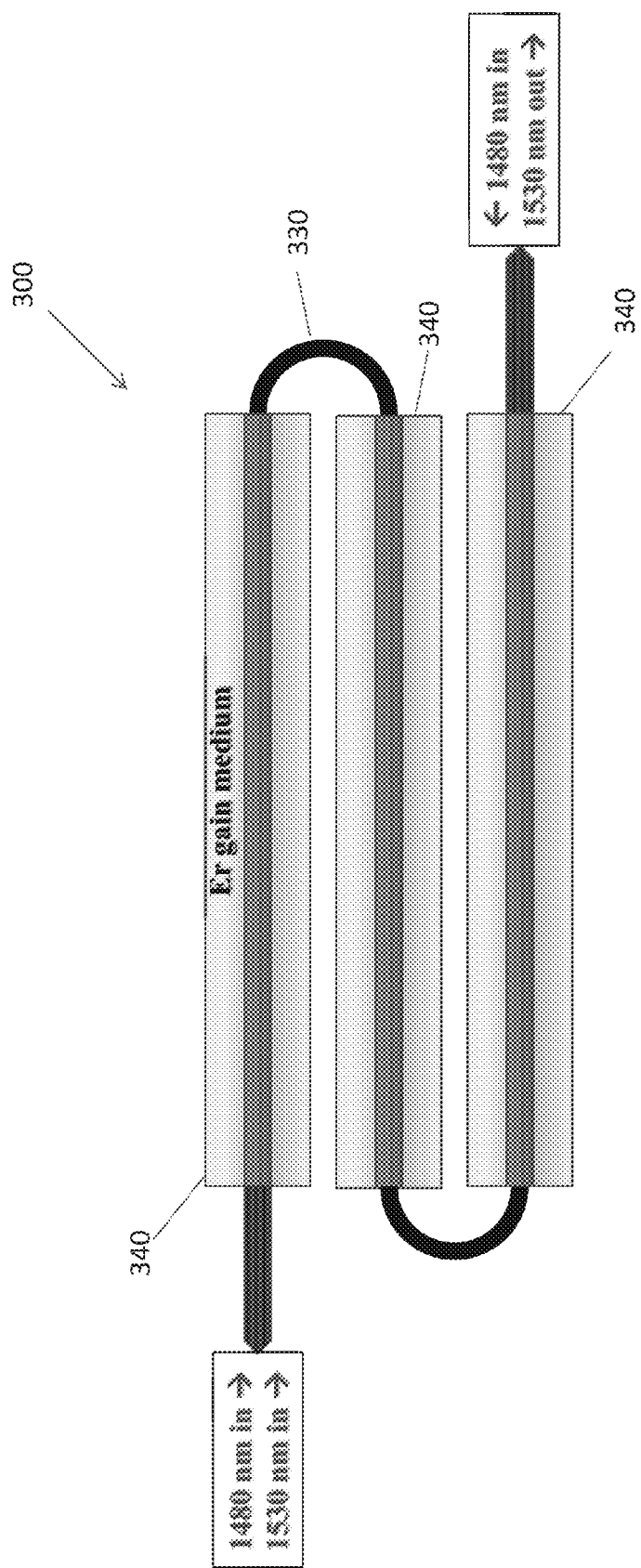
FIG. 3A is a plan diagram of an amplifier pumped at 1480 nm formed of a layer of erbium-doped aluminum oxide gain medium deposited over a strip of silicon nitride buried in a silicon dioxide layer on a silicon substrate.

FIGS. 3A-3D illustrate various amplifiers and lasers, each of which is formed by depositing one or more erbium-doped gain layers over suitably patterned strips of silicon nitride buried in a layer of silicon dioxide (not shown) below the erbium-doped gain layers. For example, FIG. 3A shows an optical amplifier 300 suitable for amplifying optical signals in the telecommunications L and C bands. The optical amplifier 300 includes three regions of gain material 340, such as erbium-doped aluminum oxide, deposited over portions of an S-shaped silicon nitride strip 330 buried within a layer of silicon dioxide (not shown). The other portions of the S-shaped silicon nitride strip 330 may be covered with undoped aluminum oxide (not shown) or another material whose refractive index is roughly the same as that of the gain material 340. In operation, a pair of counter-propagating pump beams at a wavelength of 1480 nm pumps the portions of the gain material 340 above the silicon nitride strip 130. An optical signal beam at wavelength of 1530 nm propagates along the same path as the pump beams, where it overlaps significantly with the pump beams and becomes amplified.

Figure 3B:
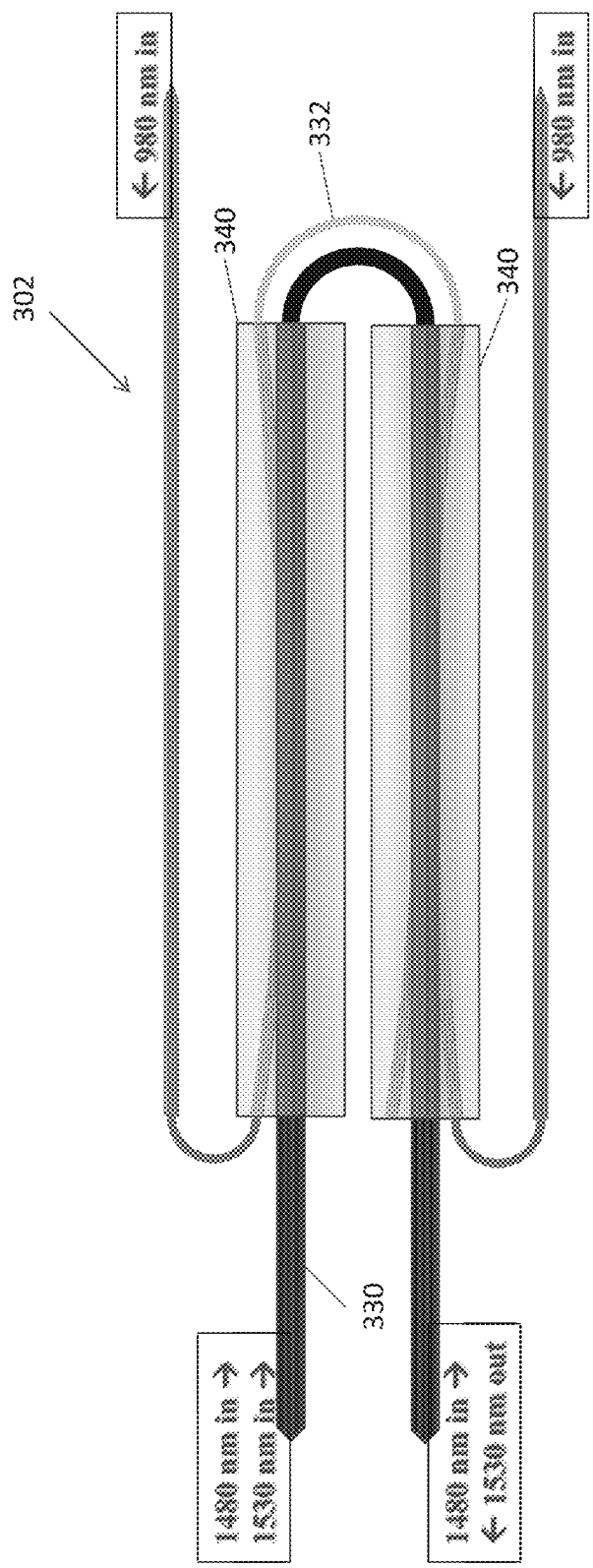
FIG. 3B is a plan diagram of an amplifier pumped at 980 nm and at 1480 nm formed of a layer of erbium-doped aluminum oxide gain medium deposited over a strip of silicon nitride buried in a silicon dioxide layer on a silicon substrate.

FIG. 3B shows another optical amplifier 302 that includes two regions of gain material 340 deposited over a U-shaped strip 330 of silicon nitride buried in a layer of silicon dioxide (not shown). As in FIG. 3A, the silicon nitride strip 330 acts to confine a 1530 nm signal beam and a pair of counter-propagating 1480 nm pump beams to overlapping portions of the gain material 340. But the optical amplifier 310 in FIG. 3B also includes another silicon nitride strip 332 whose shape, width, and position are selected to guide a pair of counter-propagating 980 nm pump beams through the overlapping portions of the gain material 340 as well. In operation, the gain material 340 absorbs the 980 nm and the 1480 nm pump beams and amplifies the 1530 nm signal beam as understood in the art.

Figure 3C:
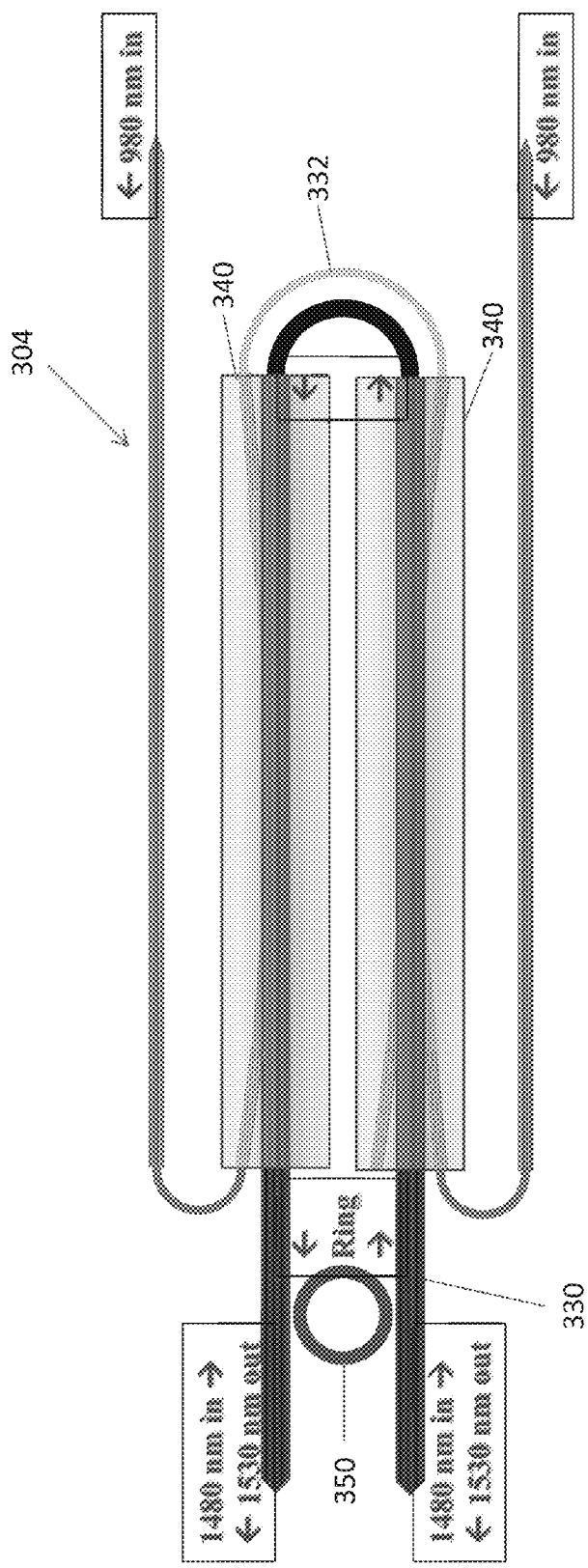
FIG. 3C is a plan diagram of a tunable silicon ring laser formed of a dielectric ring resonator and a layer of erbium-doped aluminum oxide gain medium deposited over a strip of silicon nitride buried in a silicon dioxide layer on a silicon substrate.

FIG. 3C shows a tunable silicon ring laser 304 similar to the optical amplifier 302 shown in FIG. 3B. Like the optical amplifier 302, the tunable silicon ring laser 304 includes two regions of gain material 340 deposited over a U-shaped silicon nitride strip 330 and an M-shaped silicon nitride strip 332, which are both buried in a layer of silicon dioxide (not shown). As in FIG. 3B, the silicon nitride strips 330, 332 acts to guide a 1530 nm laser beam, a pair of counter-propagating 1480 nm pump beams, and a pair of counter-propagating 980 nm pump beams through overlapping portions of the gain material 340. Unlike the optical amplifier 302, however, the laser 304 include a ring 350 of dielectric material, such as silicon, that evanescently couples light from one arm of the U-shaped silicon nitride strip 330 to the other and vice versa as shown in FIG. 3C. Because the ring 350 evanescently couples light back towards the gain material 340, it defines a laser cavity with the U-shaped silicon nitride strip 330. (The ring 350 also transmits a portion of the light resonating in the cavity.) Tuning the ring's resonance wavelength (e.g., by heating the ring 350 so as to change its refractive index) causes the laser's output wavelength to change.

Figure 3D:
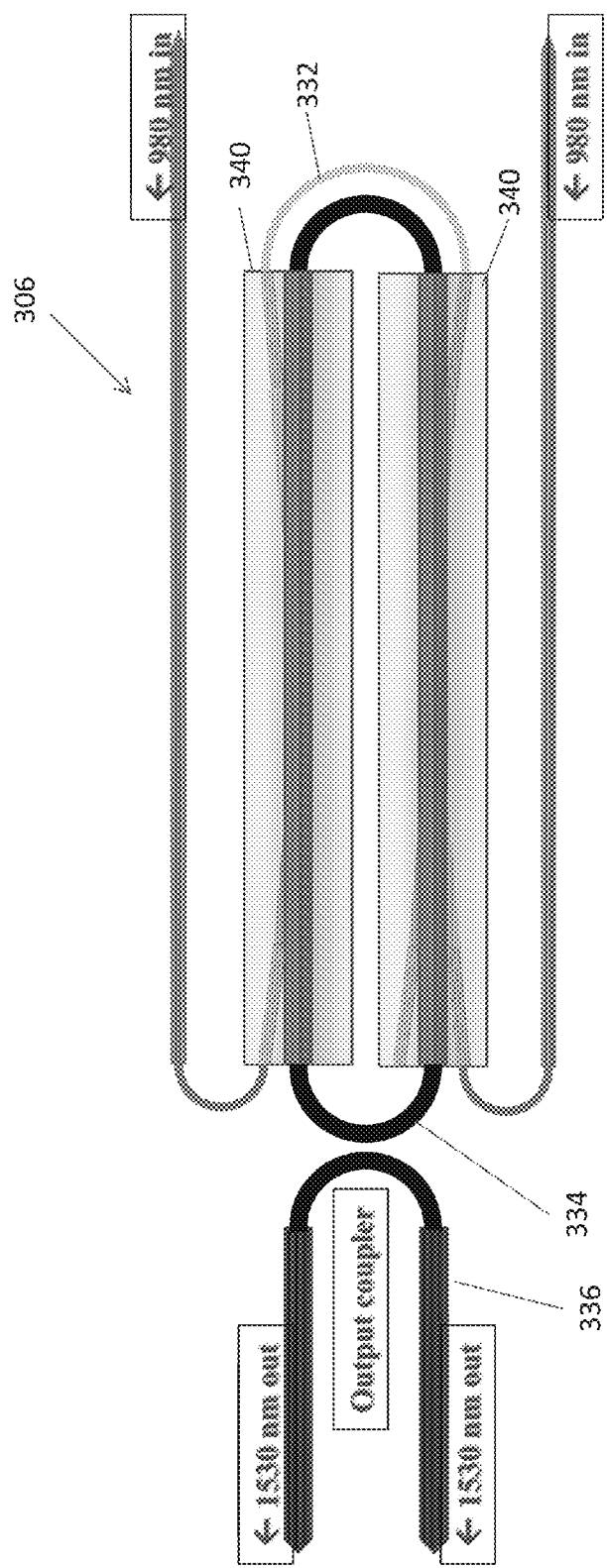
FIG. 3D is a plan diagram of a racetrack laser formed of a layer of erbium-doped aluminum oxide gain medium deposited over a strip of silicon nitride buried in a silicon dioxide layer on a silicon substrate.

FIG. 3D shows a racetrack laser 306 that includes a laser cavity defined by a racetrack-shaped silicon nitride strip 334 disposed in a layer of silicon dioxide (not shown) below regions of gain material 340, such as erbium-doped aluminum oxide or another glass doped with rare-earth ions. The racetrack laser 306 also includes two other strips of silicon nitride in the silicon dioxide layer: a pump coupler 332, which couples pump light at 980 nm into the laser cavity, and a U-shaped output coupler 336, which defines an output region that is evanescently coupled to the laser cavity. In operation, the pump coupler 332 guides counter-propagating pump beams into the laser cavity, which produces a laser beam at a wavelength in the telecommunications L- or C-band (e.g., at 1530 nm). The laser beam resonates within the laser cavity, with a portion coupled out of the laser cavity by the output coupler 336.

Gratings, Distributed Bragg Resonators, and Distributed Feedback Lasers

The silicon nitride strips can also be patterned into gratings that reflect light at certain wavelengths and transmit light at other wavelengths. For instance, a silicon nitride strip can be patterned to form a surface grating, as in a conventional distributed feedback (DFB) laser, using two separate lithographic etching steps. Alternatively, the sidewalls of a silicon nitride strip can be etched to from sidewall gratings with a single lithographic etching step. The grating's exact transmission and reflection wavelengths are set by the grating period, the refractive index, etc. The grating reflectivity and finesse are likewise set by the number of periods and the grating modulation depth, respectively.

Figure 4A:
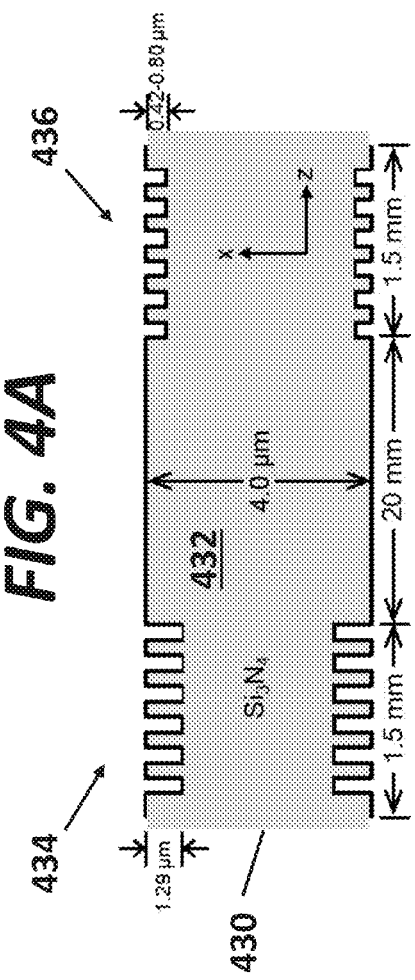
FIG. 4A is a plan view of a distributed Bragg reflector (DBR) laser cavity formed by gratings at opposite ends of a strip of silicon nitride deposited in a silicon dioxide layer just below a layer of erbium-doped aluminum oxide and above a silicon substrate.

FIG. 4A is a schematic diagram of a silicon nitride strip 430 that has been patterned to include a highly reflective grating 434 and an output-coupler grating 436 on either side of a cavity 432. Together, the cavity 432, highly reflective grating 434, and output-coupler grating 136 form a distributed Bragg reflector (DBR) resonator. In this case, the laser cavity 434 is about 20 mm long and has a width of about 4.0 μm. Each of the gratings 434, 436 has a length of about 1.5 mm, a duty cycle of about 50%, and a grating period Λ selected to transmit light at the laser wavelength. For example, grating periods of 478 nm, 487 nm, and 498 nm correspond to Bragg wavelengths of 1536 nm, 1561 nm, and 1596 nm, respectively. The highly reflective grating 434 has a modulation depth of 1.29 μm for a reflectivity of nearly 100%, and the output-coupler grating 436 has a modulation depth that varies from about 418 nm to about 796 nm to yield a reflectivity of about 85% to about 99.6%.

The patterned silicon nitride strip 430 shown in FIG. 4A can be buried in a layer of silicon dioxide, which is then covered with a layer of erbium-doped aluminum oxide or another suitable gain medium, just like the silicon nitride strip shown in FIG. 1A. (If desired, the erbium-doped aluminum oxide may be deposited over only the laser cavity 432.) And as in FIG. 1A, an oxide gap with a thickness of less than or equal to half the pump wavelength can be used to separate the silicon nitride strip 430 from the gain layer (not shown). In operation, the patterned silicon nitride strip 430 helps to confine the pump and laser beams within overlapping regions of the erbium-doped aluminum oxide above the patterned silicon nitride strip 430.

Figure 4B:
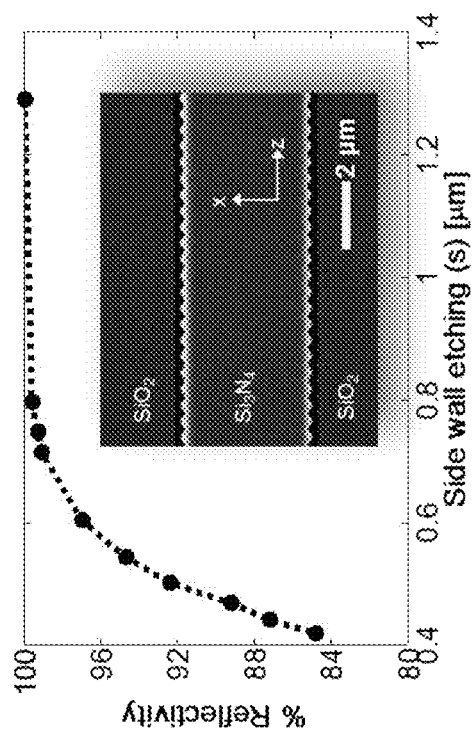
FIG. 4B is a plot of the reflectivity versus side wall etching depth for the gratings shown in FIG. 4A (the inset shows a scanning electron microscope image of a fabricated grating).

FIG. 4B is a plot of the grating reflectivity versus modulation depth (side wall etching depth) calculated using coupled-mode theory for gratings like those shown in FIG. 4A. The reflectivity asymptotically approaches 100% at modulation depths greater than about 0.8 μm. The inset shows a scanning electron microscope (SEM) image of an output-coupler grating etched into a silicon nitride strip, which is deposited in a layer of silicon dioxide.

Figure 5B:
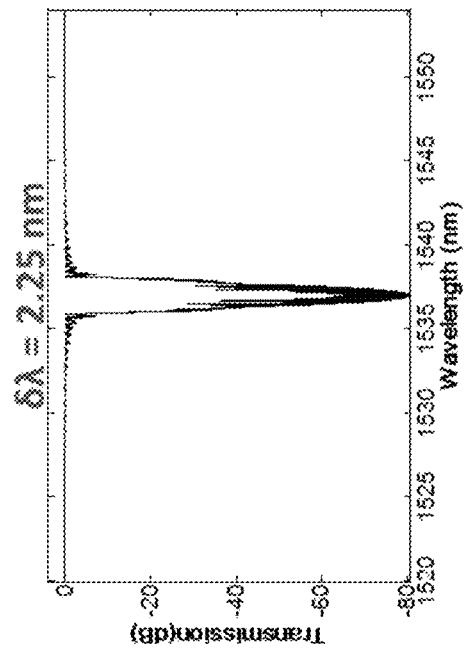
FIGS. 5A and 5B are plots of the measured and simulated transmission versus wavelength for a DBR grating like those illustrated in FIGS. 4A and 4B.
Figure 5A:
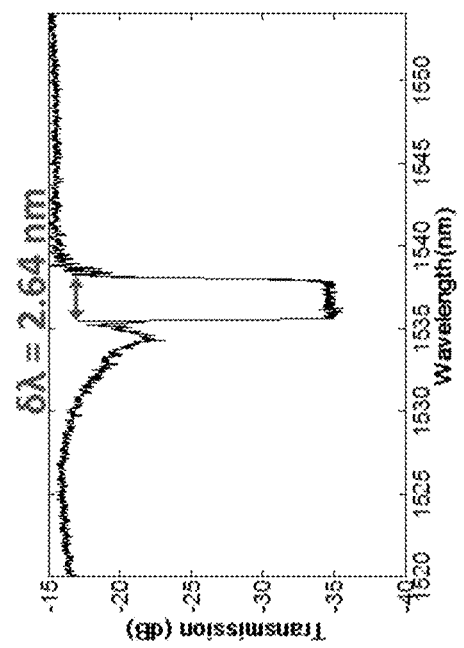

FIGS. 5A and 5B are plots of the transmission spectra for a DBR grating like those shown in FIGS. 4A and 4B. FIG. 5A shows a measured transmission spectrum, and FIG. 5B shows a simulated transmission spectrum for the same device.

FIG. 6A is a diagram of a system 600 used to characterize a photonic device 610, such as a laser or amplifier like the ones described above. The system includes a 978 nm laser diode 620 and a 975 nm laser diode 622, both of which are optically coupled to the photonic device 610 via the 980 nm ports of fiber-optic 980 nm/1550 nm wavelength division multiplexors 630 and 632, respectively. Paddle-wheel polarization controllers 640 and 642 can be used to transform the polarization states of the pump beams. The 1550 nm ports of the WDMs 630 and 632 transmit the laser output to an optical spectrum analyzer (OSA) 650, which records the spectrum of the laser output, and to a power meter 652, which measures the laser output power.

FIGS. 6B-6D shows measurements of DFB and DBR lasers made using the system 600 of FIG. 6A. Insertion loss measurements suggest that the coupling losses at each facet of the photonic device are about −5.6 dB and about −7.3 dB for TE-polarized light at wavelengths of 980 nm and 1550 nm, respectively. Given the measured facet loss, the 978 nm and 975 nm laser diodes launched maximum pump powers of 147 mW and 98 mW, respectively, into the laser under test. To characterize the laser performance, the output power was measured as a function of pump power as plotted in FIG. 6B, first by pumping with the 978 nm laser diode only, and then with the 978 nm laser diode (at maximum pump power) and the 975 nm laser diode. The maximum on-chip output power is about $P_{max}$=5.1 mW with a lasing threshold of $P_{th}$=44 mW, which corresponds to a slope efficiency of about $\eta$=2.6%.

FIG. 6C is a plot of the output spectra of DBR lasers whose outputs are centered at wavelengths of 1536 nm, 1561 nm, and 1596 nm obtained using the OSA 650 in the system 600 of FIG. 6A. Each of the DBR lasers has an output that lies within the C band or the L band. The maximum output power is obtained from the DBR laser with a center wavelength of $\lambda_c$=1561 nm and grating reflectivities of $R_1$=100% and $R_2$=95%. The maximum output powers for the DBR lasers are $P_{max}$=2.5 mW ($\lambda_c$=1536 nm) and $P_{max}$=0.5 mW ($\lambda_c$=1596 nm). These outputs are obtained from cavities with reflectivity of $R_2$=86% ($\lambda_c$=1536 nm) and $R_2$=95% ($\lambda_c$=1596 nm), respectively. The difference in the optimum reflectivity for the DBR cavities can be attributed to the difference in the gain threshold and maximum small signal gain at different wavelengths. The laser emission at 1596 nm is a consequence of low grating scattering loss, low background losses in the $Al_2O_3$:$Er^{3+}$ film, and the wide gain spectrum of $Al_2O_3$:$Er^{3+}$.

FIG. 6D is a plot of laser power versus launched pump power for a pair of DFB lasers with grating lengths of 15 mm (circles) and 23 mm (squares). The slopes of the linear fits to the data provide estimates of conversion efficiency, which can be as high as 7% for a 23 mm long grating. In each laser, the SiN strip width was 4 µm, the grating period was 489 nm, and a quarter-wavelength phase shift in the center defined the cavity. The grating modulation depths on the sides of the waveguides were 100 nm, 123 nm, and 145 nm (FIG. 6D shows results for only 145 nm modulation depths, which are similar to results for the 100 nm and 123 nm modulation depths). Each laser also included a gain layer formed of aluminum oxide doped with erbium ions at a concentration of about 1×20 cm$^{-3}$ to promote lasing in the cavities with longer photon lifetimes (larger quality factors) without an excess of quenched ion pairs increasing the threshold. The DFB lasers were pumped with a 1480 nm wavelength fiber laser using an SM980 fiber (6 µm core diameter) at one edge and the emitted photons are collected from the other edge. The fiber-to-chip coupling introduced approximately 10 dB loss both for the pump and the emitted signal. DFBs with larger grating modulation depths (e.g., 123 nm and 145 nm) exhibited single mode lasing at a wavelength of 1563 nm. The highest slope efficiency—7 percent—was achieved with a modulation depth of 145 nm and a grating length of 23 nm.

Output intensity fluctuation affects lasers whose gain media are doped with rare-earth ions. These fluctuations are usually attributed to a combination of self-pulsating due to fast-decaying ion pairs and resonant amplification of pump noise at the relaxation frequency. Several of the techniques proposed for spiking suppression, such as secondary pumping, semiconductor amplification, and very long cavity lifetime filtering, are not applicable to on-chip, waveguide-based devices. Fortunately, rate equations based on a small percentage of very fast quenched ions (with a spontaneous emission lifetime of about 1 µs as opposed to 7.5 ms for unquenched ions) suggest that the DFB lasers described above can operate without significant output intensity fluctuations when excited with more intense pumps.

FIGS. 7A-7D are plots of measured laser output power versus time for pump powers of 0.3 W, 0.6 W, and 1.1 W over relatively long and short time scales, respectively. These plots show that the measured laser output stability depends strongly on pump power. When pumped slightly above threshold (e.g., at P=300 mW), the laser output underwent nearly full-scale pulsing with a frequency of 822 kHz. Increasing the pump intensity caused the oscillation frequency to increase and suppressed the pulsing behavior. Even on the 0.5 ms timescale shown in FIGS. 7B-7D, the output power at lower pump powers fluctuates more than the at higher pump powers.

DBR and DFB Laser Arrays

If desired, an array of suitably patterned silicon nitride strips can be used to define an array of DBR or DFB lasers in an erbium-doped aluminum oxide gain layer. Patterning adjacent silicon nitride strips with gratings of different periodicities yields an array of lasers with outputs at different wavelengths. By choosing the periodicities appropriately, the laser output wavelengths can be selected to span a particular range of wavelengths, such as the wavelengths used for WDM or dense WDM (DWDM) communications.

In many conventional DFB lasers, the laser cavity includes a quarter-wave phase shift to promote lasing in a single longitudinal mode. Typically, this quarter-wave phase shift is applied directly to the grating period. Unfortunately, incorporating quarter-wave phase shifts makes it extremely challenging, if not impossible, to fabricate an array of DFB lasers for WDM applications using optical lithography because the lasers' gratings may be shifted with respect to each other by less than one nanometer.

FIG. 8A illustrates a technique for incorporating quarter-wave phase shifts into the cavity of a DFB laser that does not necessarily involve sub-nanometer etching. This technique, known as equivalent phase shifting (EPS), involves etching an EPS grating 805 into the sidewall of silicon nitride strip. This EPS grating 805 can be seen as a uniform grating 803 with period Λ modulated by a quasi-periodic sampling function 801 with period P (P>>Λ). Because the EPS grating 805 is the product of a uniform grating 803 and the quasi-periodic sampling function 801, it generates multiple resonant orders within its transmission spectrum, as shown in FIGS. 8B and 8C. The wavelength spacing Δλ between adjacent resonant orders is given by $$\Delta\lambda = \frac{2n_{eff}\Lambda^2}{P} \quad (3)$$

where $n_{eff}$ is the effective refractive index of the waveguide into which the EPS grating 805 is etched. The wavelength of the 0 order is given by the Bragg condition $\lambda_0 = 2n_{eff}\Lambda$. Phase shifting the sampling function by ΔL introduces an equivalent phase shift Δφ in the center of the +1 order, where $$\Delta\varphi = \frac{2\pi\Delta L}{P} \quad (4)$$

Therefore, an equivalent quarter-wave phase shift (Δφ=π) occurs in the −1 order when ΔL=P/2, as shown in the simulated transmission spectra plotted in FIGS. 8B and 8C. Since ΔL is usually much larger than the grating period (as P>>Λ), the phase shift can be accurately controlled by equivalent phase shifting. Moreover, since the resonant wavelength of the equivalent phase shift in the −1 order is $\lambda_{-1} = \lambda_0 + \Delta\lambda$, the resonant wavelength can be stepped by changing the sampling period P while keeping the grating period Λ constant.

The variation of the resonant wavelength with the sampling period P independent of the grating period Λ makes it possible to create a multi-channel Bragg grating array with quarter-wavelength phase-shifts using optical lithography. The wavelength spacing of a multi-channel array is given by $$\Delta\lambda_{CH} = 2n_{eff}\left(\frac{\Lambda}{P}\right)^2 \Delta P \quad (5)$$

where ΔP is the step size of the sampling period. In optical lithography, the grating period Λ can be kept constant provided that the channels are close to each other on the mask. And since Λ<<P, the wavelength spacing $\Delta\lambda_{CH}$ can be accurately controlled by ΔP to make a quarter-wave phase-shift Bragg grating array with equalized wavelength spacing.

Figures 9A, 9B:
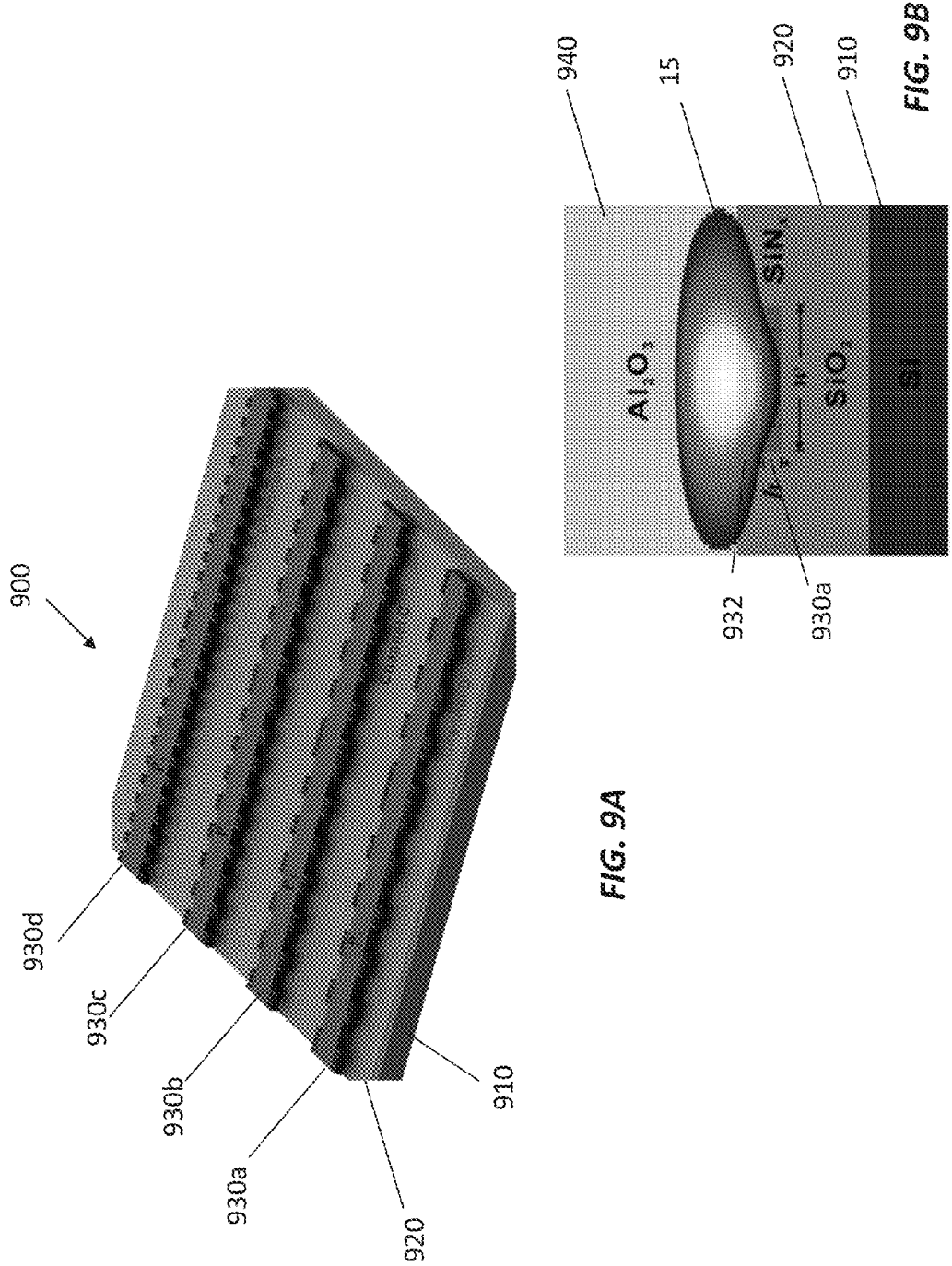
FIG. 9A is a perspective view of an integrated four-channel array of equivalent phase shift (EPS) gratings fabricated in silicon nitride for use in an array of DFB lasers.
FIG. 9B shows a cross section of a waveguide fabricated using one of the EPS gratings shown in FIG. 8A and the fundamental optical mode guided by the corresponding waveguide.

FIGS. 9A and 9B show a DFB laser array 900 with quarter-wave phase-shifted EPS gratings like the grating 805 shown in FIG. 8A. Like the photonic devices disclosed above, the DFB laser array 900 includes a thermally grown silicon dioxide layer 920 disposed on a silicon substrate 910. The DFB laser array 900 also includes four silicon nitride strips 930a-930d (collectively, silicon nitride strips 930), each of which has a thickness of 100 nm and a maximum width of 4 μm. Each silicon nitride strip 930 was etched in a 300 mm CMOS foundry using 193 nm optical immersion lithography at a 65 nm technology node with an EPS grating whose grating period Λ equals 480 nm, grating duty cycle equals 50%, and sampling-period step size ΔP equals 12.25 μm.

As shown in FIG. 9B, the silicon nitride strips 930 are covered by a thin layer 932 of silicon dioxide, which in turn is covered by an aluminum oxide layer 940 that is deposited as the upper cladding. If desired, at least a portion of the aluminum oxide layer 940 can be doped with erbium, ytterbium, and/or other rare-earth ions to provide gain. And the layer stack and waveguide dimensions may be chosen to increase or maximize the gain for the guided optical mode(s). In operation, the silicon nitride strips 930 confine fundamental modes 15 of the laser and pump beams within overlapping regions of the aluminum oxide layer 940 as shown in FIG. 9B and described above with respect to FIGS. 1A-1C.

Figure 9D:
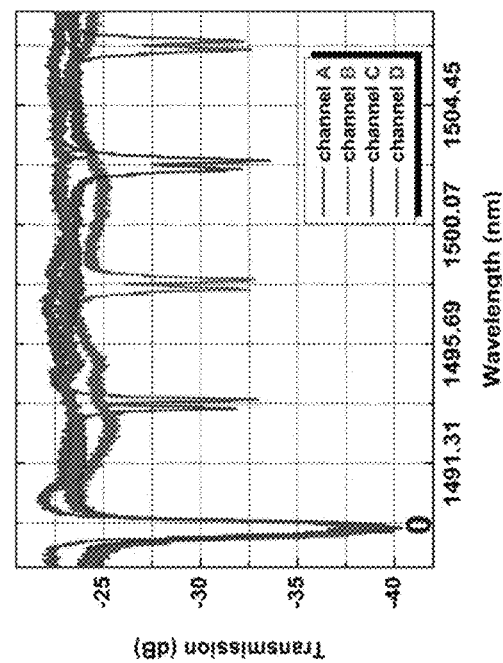
FIG. 9D is a close-up view of the −1 order shown in FIG. 9C.
Figure 9C:
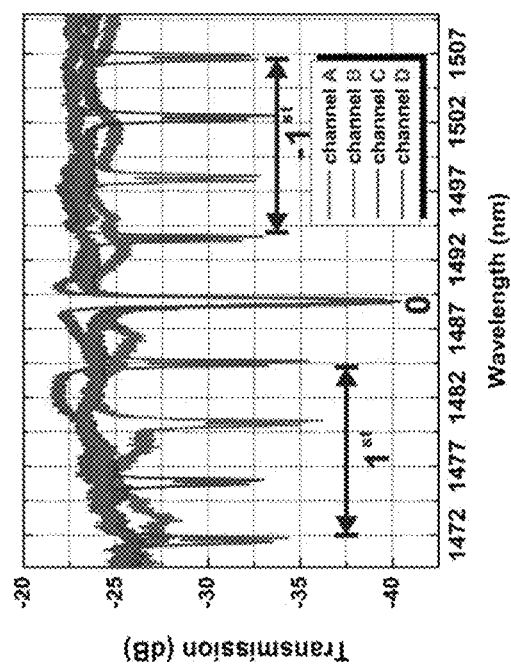
FIG. 9C is a plot of the measured transmission spectra of the gratings shown in FIG. 9A.

FIGS. 9C and 9D show the measured transmission spectra of the four gratings in the DFB laser array 900 of FIGS. 9A and 9B. The transmission spectra of the transverse-electric (TE) modes were measured using a tunable laser with a wavelength spacing of 10 μm. As predicted by the simulations in FIGS. 8B and 8C, several resonant orders appear in each channel. FIG. 9D shows a close-up view of the 0 order and the −1 order. An equivalent quarter-wave phase shift is generated in the −1 order in each channel. The measured resonant wavelengths of the gratings are 1493.48 nm, 1497.88 nm, 1502.25 nm, and 1506.65 nm, respectively. The spacing between the adjacent channels is 4.40 nm, 4.37 nm, and 4.40 nm, which is highly equalized with a variation below 30 pm. This extremely equalized channel spacing benefits from the use of EPS structure where channel spacing difference is immune from fabrication variations, according to Equation (5). The fundamental orders (or Bragg wavelengths) of all four channels are aligned, meaning the channels' baseline grating periods Λ are statistically equal since they are close to each other (e.g., about 75 μm apart) on the mask.

Multi-Segment DBR Lasers

Figure 10A:
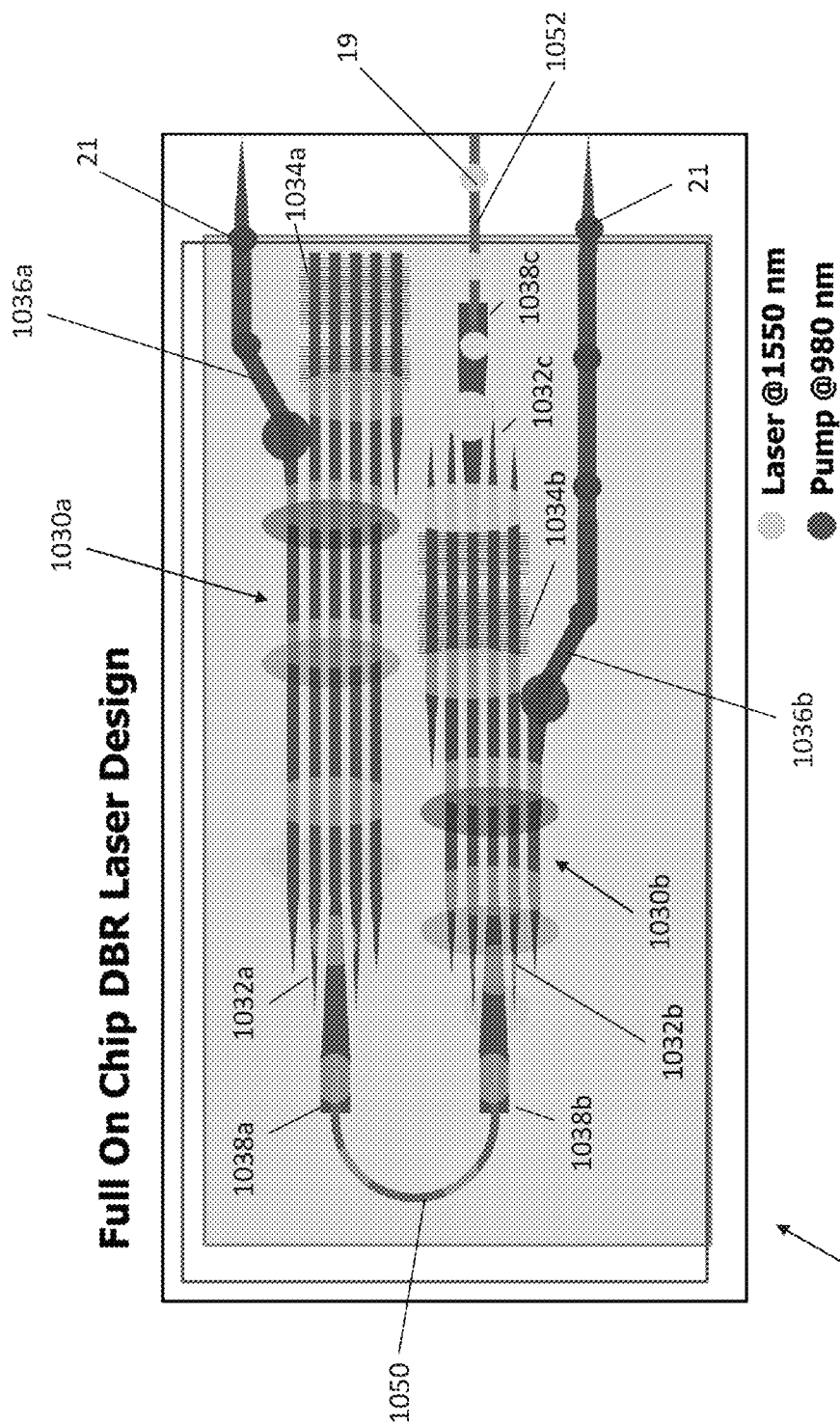
FIG. 10A is a plan view of a photonic device (DBR laser) that includes a five-segment waveguide pumped by a pair of pump beams.
Figure 10B:
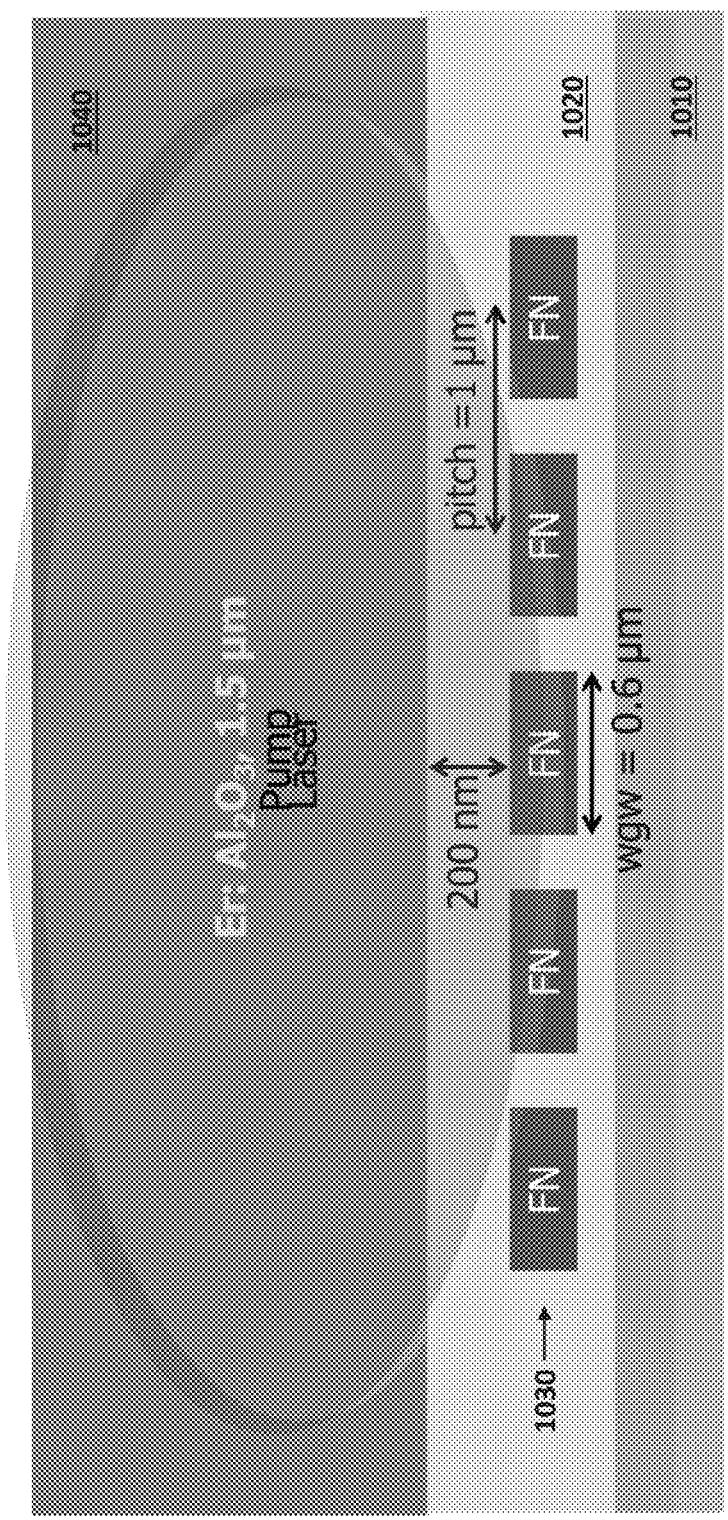
FIG. 10B is a cross sectional view of the five-segment waveguide shown in FIG. 10A.

FIGS. 10A-10E illustrate a multi-segment DBR laser 1000 that includes two groups of multiple silicon nitride segments 1030a and 1030b (collectively, silicon nitride segments 1030) disposed within a silicon dioxide layer 1020, which is sandwiched between a silicon substrate 1010 and an aluminum oxide layer 1040 doped with erbium ions. As shown in FIG. 10B, the silicon nitride segments 1030 are arrayed about 200 nm below the aluminum oxide layer 1040 at a pitch of about 1 μm with widths of about 600 nm each. Expressed in terms of the pump wavelength, the widths and pitch of the silicon nitride segments 1030 may range from about $\lambda_p/4$ to about $20\lambda_p$ and from about $\lambda_p/10$ to about $2\lambda_p$, respectively. At least a portion of the aluminum oxide layer 1040 is doped with erbium ions and/or other co-dopants, such as ytterbium and other rare-earth ions.

As shown in FIG. 10A, the silicon nitride segments 1030a in the first group run parallel to each other over a region extending from a highly reflective DBR 1034a to a U-shaped silicon waveguide 1050. The outer silicon nitride segments in the first group 1030a terminate in tapered regions 1032a near the U-shaped silicon waveguide 1050, whereas the central silicon nitride segment 1030 expands to form a coupler 1038a connected to one end of the U-shaped waveguide 1050. In some cases, the waveguide width tapers from about $\lambda_p/10$ to cutoff wavelength, which may be about $\lambda_p/4$ to about $3\lambda_p$. The other end of the U-shaped silicon waveguide 1050 connects to a complementary coupler 1038b at one end of the central silicon nitride strip in the second group 1030b of silicon nitride strips. The outer silicon nitride segments in the second group 1030b also terminate in tapered regions 1032b near the U-shaped silicon waveguide 1050. A DBR 1034b that transmits light at the laser wavelength is located at the other end of the second group 1030b of silicon nitride strips, one of which terminates in a coupling region 1038c coupled to an output waveguide 1052 and the rest of which terminate in tapered regions 1032c. Together, the DBRs 1034a and 1034b (collectively, DBRs 1034) form a resonant laser cavity in which light 19 at the laser wavelength (e.g., 1550 nm) is guided in the erbium-doped aluminum oxide gain layer 1040 over the silicon nitride strips 1030.

Figure 10C:
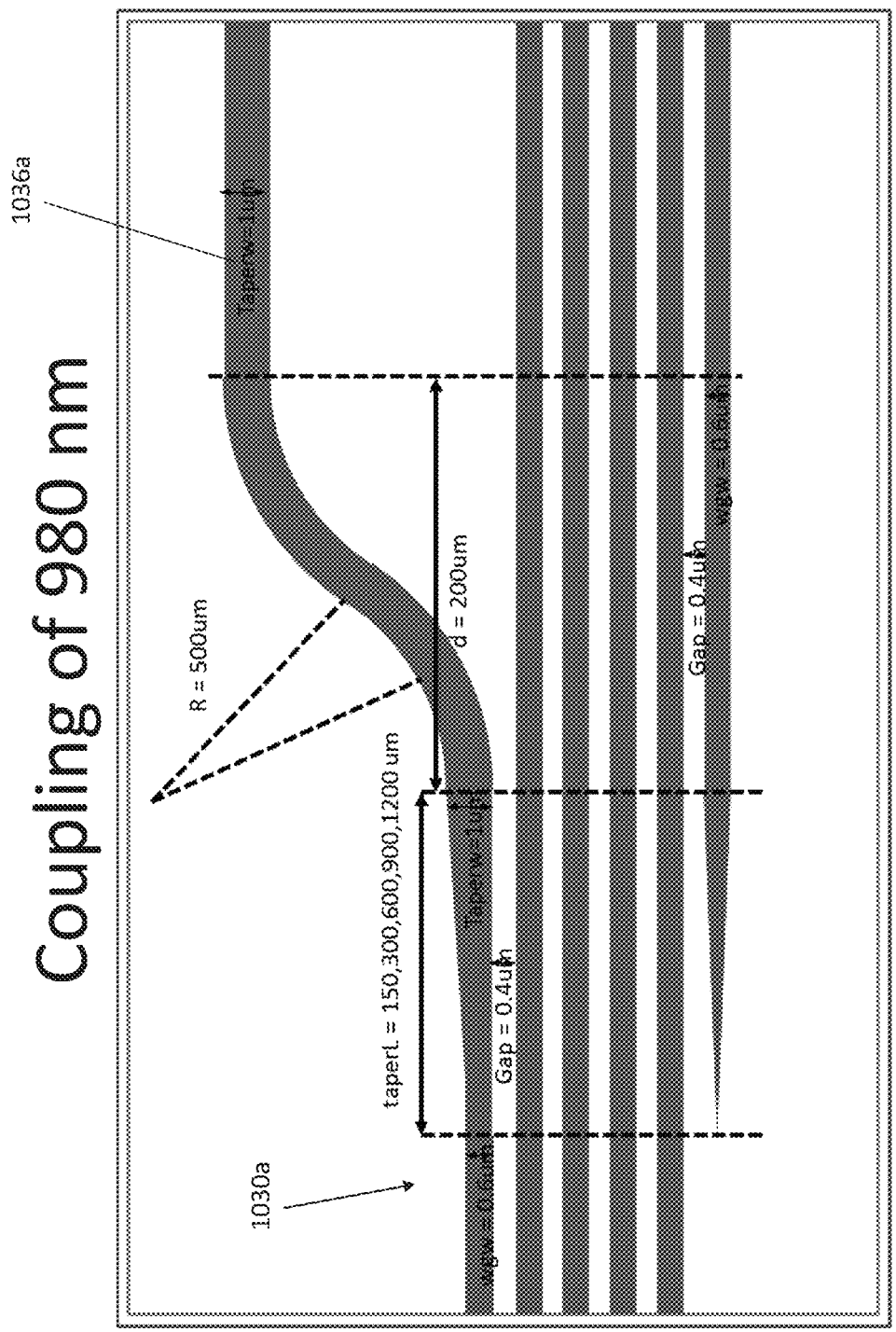
FIG. 10C is a close-up plan view of the photonic device shown in FIG. 10A.

As shown in FIGS. 10C-10E, pump light 21 enters the laser cavity from pump diodes (not shown) via pump waveguides 1036a and 1036b (collectively, pump waveguides 1036). The pump waveguide 1036a has a width of about 1.0 μm near the edge of the chip (i.e., close to the pump diode), then bends with a radius of curvature of about 25-500 μm over a length of about 200 μm before tapering linearly to a width of about 0.6 μm. The tapered section of the pump waveguide 1036a runs parallel to the first group of silicon nitride segments 1030a. As shown in the simulations of FIGS. 10D and 10E, the 980 nm pump beam 21 propagates along a path parallel to the pump waveguide 1036a, then couples into a region over the first group 1030a of silicon nitride strips. At the same time, the 1550 nm laser beam 19 propagates through an overlapping region of the gain layer 1040 defined by the first group 1030a of silicon nitride strips.

Photonic Device Fabrication

Figure 11:
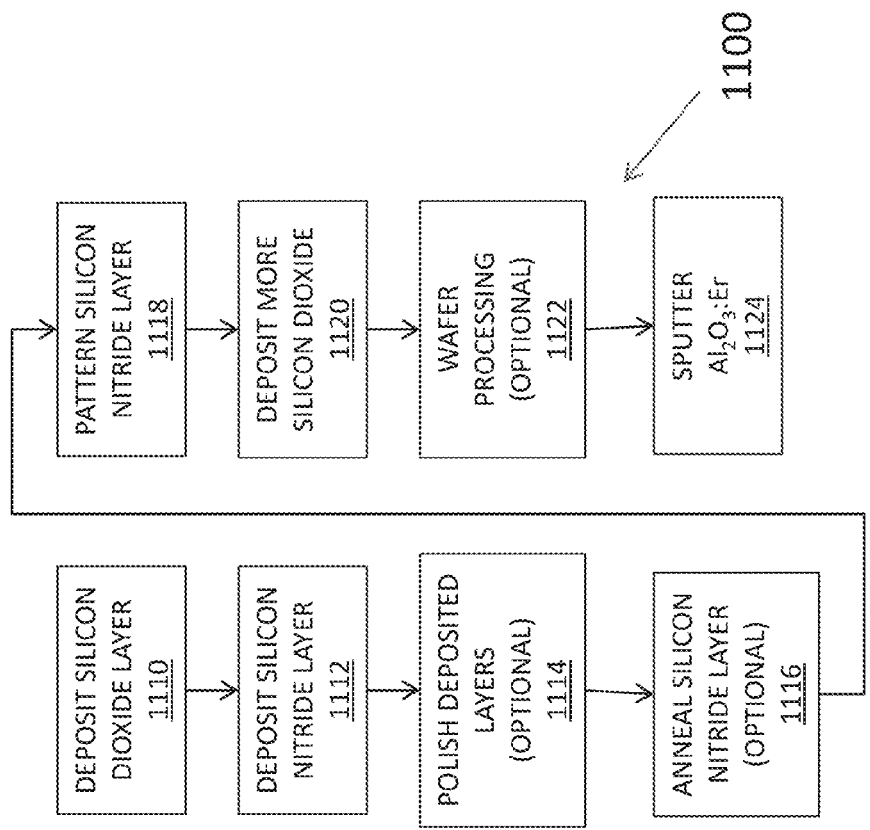
FIG. 11 illustrates a process for making a photonic device with an optical waveguide formed by a strip of silicon nitride deposited in a silicon dioxide layer just below a layer of erbium-doped aluminum oxide and above a silicon substrate.

FIG. 11 illustrates a process 1100 for fabricating lasers, amplifiers, and other photonic devices that include waveguides in erbium-doped glass defined by silicon nitride strips. In step 1110, a layer of silicon dioxide is deposited on a silicon substrate using plasma-enhanced chemical vapor deposition (PECVD) or any other suitable deposition technique. This silicon dioxide layer may be about 6 μm thick and may be etched away to form a trench, which is filled in step 1112 with a 0.1 μm thick silicon nitride layer, also grown using PECVD. The trench can be about 5 μm wide to the width of the chip, and trench can be about 1-5 μm deep (e.g. 3 μm deep). Alternatively, the silicon nitride can be deposited on top of the silicon dioxide instead of within a trench formed in the silicon dioxide.

In optional step 1114, both the silicon dioxide layer and the silicon nitride layers are chemically mechanically polished to reduce losses due to surface roughness. The silicon nitride layer is subsequently annealed in optional step 1116 at 1050° C. for 72 minutes to reduce absorption due to Si—H and N—H bonds at wavelengths around 1.52 μm. In step 1118, the nitride layer was then patterned, e.g., to form waveguides and/or gratings, using 193 nm immersion lithography and reactive ion etching. After patterning, another silicon dioxide layer was deposited on and around the patterned silicon nitride and chemically mechanically polished to a final thickness of 0.1 μm above the silicon nitride layer in step 1120.

Steps 1110 through 1120 can be performed using conventional complementary metal-oxide-semiconductor (CMOS) processing techniques. Once the CMOS process steps are complete, the silicon substrate (wafer) can be processed in optional step 1122 using conventional techniques. For instance, trenches for dicing and fiber end coupling may be etched into the edges of the dies by deep oxide and silicon etching before the wafers are transferred from the CMOS foundry and diced into individual dies. An erbium-doped aluminum oxide layer is deposited onto the silicon dioxide surfaces of the dies by reactive co-sputtering in step 1124. In some cases, the background loss and dopant concentration in the erbium-doped aluminum oxide film can be less than about 0.1 dB/cm and $10^{20}$ cm$^{-3}$, respectively, as measured using prism coupling.

Integration of Erbium Laser on Photonics Platform

Figure 12:
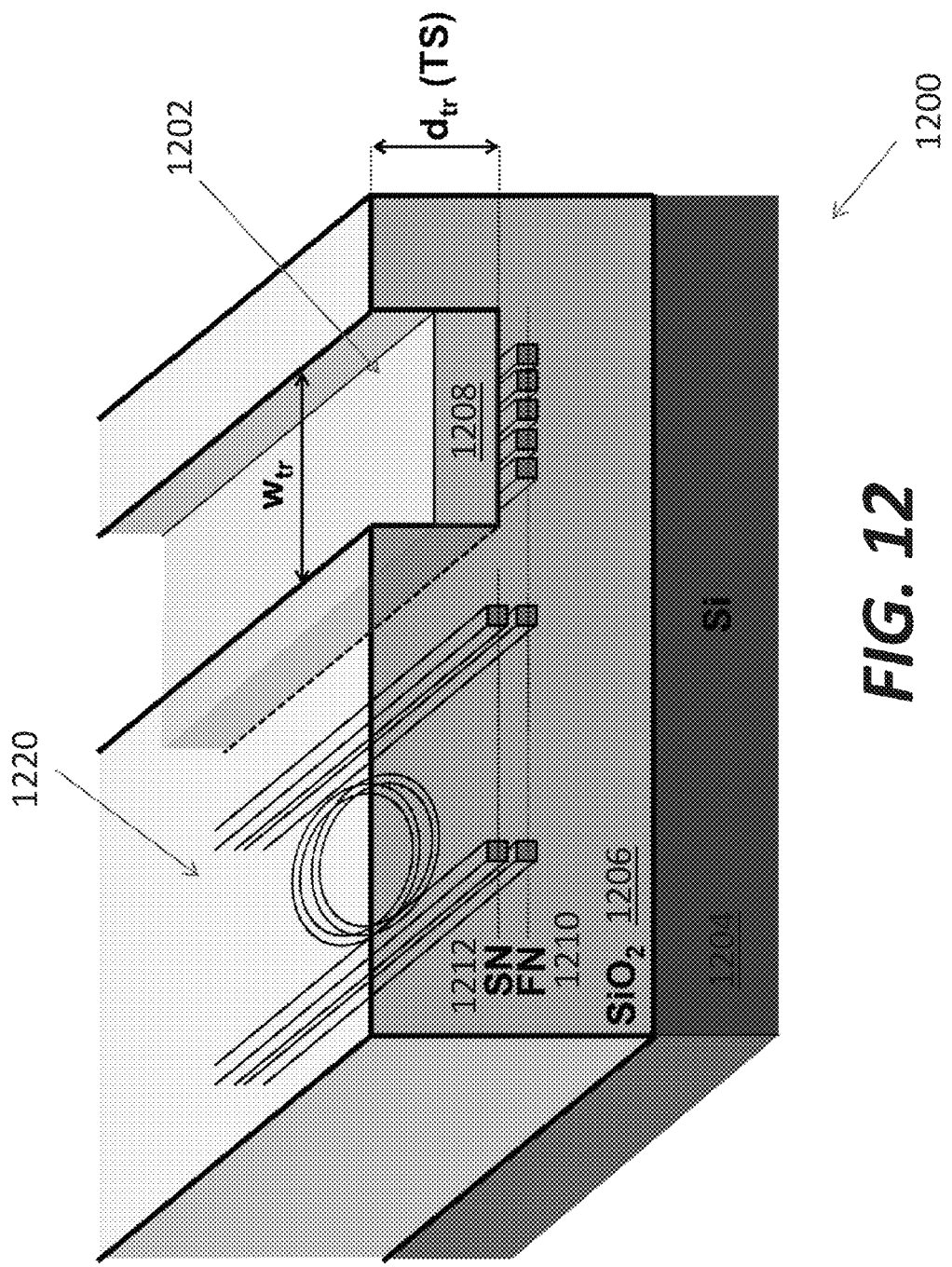
FIG. 12 shows a schematic of an exemplary integrated photonics platform with erbium-doped glass deposited in a trench.

Further embodiments include integration of Er:Al$_2$O$_3$ lasers on the SiN$_x$ photonics platform. FIG. 12 shows the schematic of an exemplary integrated photonics platform 1200. Trenches 1202 of 4 μm depth are patterned and filled with Er:Al$_2$O$_3$ 1208, thus allowing construction of Er:Al$_2$O$_3$ lasers on a silicon substrate 1204 while maintaining the performance of other photonic devices. A multi-segmented waveguide design in a 200 nm thick SiN$_x$ layer for the laser structure 1200, which includes a waveguides defined by strips and rings of silicon nitride 1210 and 1212 in silicon dioxide 1206 on a silicon substrate 1204. The resulting design facilitates broadband, high confinement, and overlap factors across the entire near-infrared wavelengths (e.g., about 0.9 μm to about 2.0 μm) offering potential for amplifier and laser operation across an extremely broad bandwidth, a result that will become of increasing importance as the S, C, and L bands become saturated. For instance, the structure 1200 may include a 50 GHz SiN$_x$ ring filter 1220 with a 26 μm bend radius, a maximum output power of 0.44 mW in the distributed Bragg reflector laser (DBR) and 0.18 mW in the distributed feedback laser (DFB).

The wafers were fabricated within a 300 mm CMOS foundry line. A layer of 200 nm SiN$_x$ was deposited by low-pressure chemical vapor deposition (LPCVD) on a 6 μm thick plasma-enhanced chemical vapor deposition (PECVD) silicon dioxide (SiO$_2$) layer 1206. This first nitride (FN) layer 1210 was then patterned using 193 nm immersion lithography and reactive ion etching. After patterning, a PECVD SiO$_2$ layer was deposited and chemically mechanically polished (CMP)-ed to a thickness of 100 nm above the FN layer 1210. A second 200 nm thick PECVD nitride (SN) layer 1212 was deposited and then patterned, followed by an additional deposition of 4 μm SiO$_2$. Like the FN layer 1210, the SN layer 1212 can also be used to construct various passive components. Additionally, for Er:Al$_2$O$_3$ laser structures, the SN layer 1212 can be utilized as an etch stop for the erbium-filled trench 1202.

FIGS. 13A-13D illustrate a process of fabricating the trench 1202 shown in FIG. 12. In FIG. 13A, the FN layer 1210 and SN layer 1212 are patterned and buried under SiO$_2$. In FIG. 13B, a trench mask was developed to etch the SiO$_2$ by wet etching, followed by dry etching of the SN layer 1212. In FIG. 13C, after the nitride was etched away, another 100 nm of SiO$_2$ 1302 was deposited to make the total oxide layer thickness equal to about 200 nm. Finally, in FIG. 13D, an Er:Al$_2$O$_3$ film 1208 was deposited by reactive co-sputtering. A typical dimension for the erbium trench for a single laser has the width $w_{tr}$ of about 25 μm and a length $L_{tr}$ of about 25 mm.

Figure 14A:
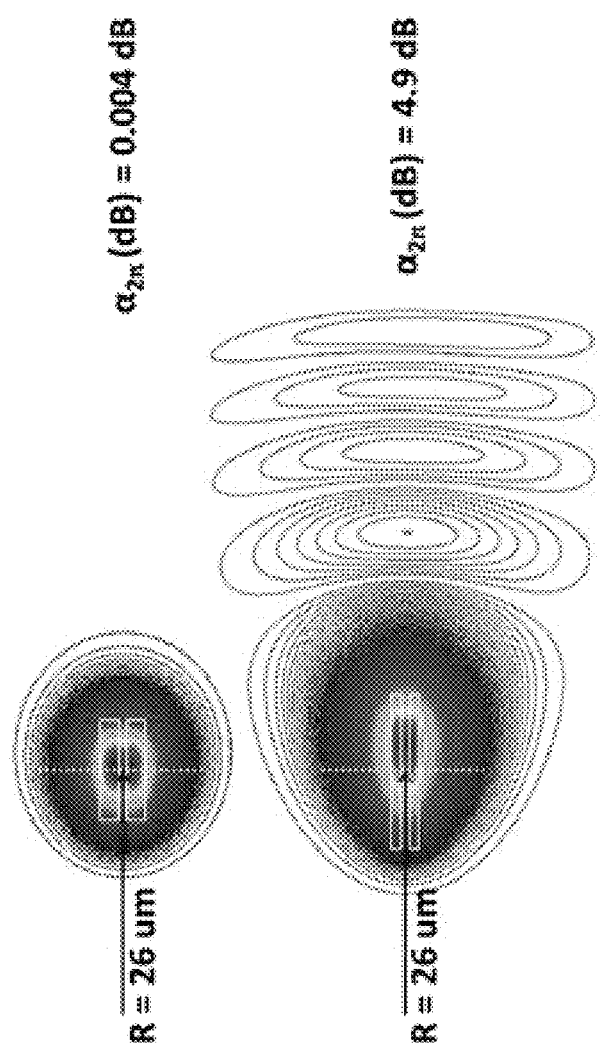
FIG. 14A shows plots of fundamental TE modes for 200 nm and 100 nm thick nitrides simulated using a finite difference (FD) mode solver.

The rationale for choosing thickness of 200 nm for SiN$_x$ is illustrated in FIG. 14A. From finite difference (FD) mode solver, the fundamental TE cutoff widths of 200 nm and 100 nm thick nitrides are 1.1 μm and 1.7 μm, respectively. For the same bend radius of R=26 μm, the simulated bend loss of one roundtrip $\alpha_{2\pi}$ for 200 nm thick SiN$_x$ is almost negligible compared to the roughly 5 dB loss in 100 nm nitrides, possibly because lower index contrast in thinner nitride tends to couple to the radiation mode in SiO$_2$. A tighter bend radius yields greater compactness and larger free spectral range (FSR), which allows more channels for optical communication.

Figure 14B:
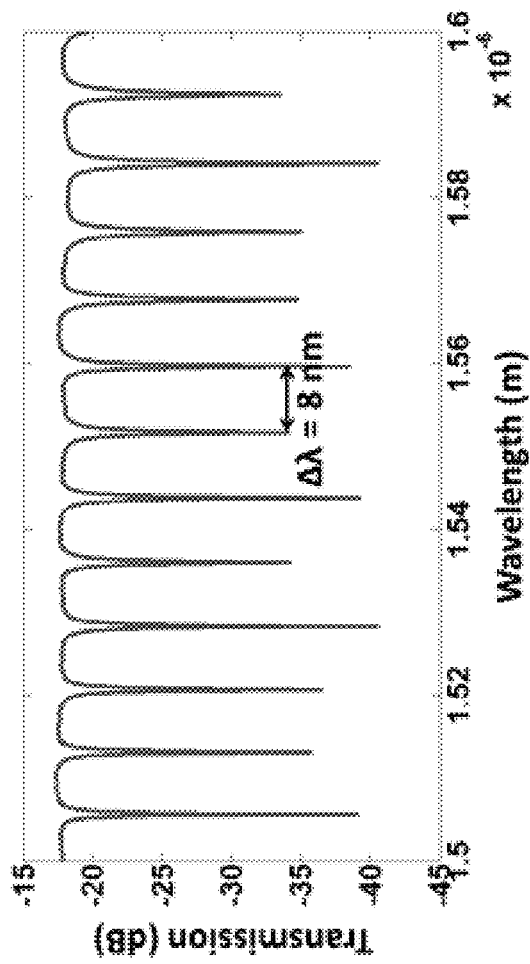
FIG. 14B shows an experimental measurement of transmission in a 50 GHz ring filter with radius R=26 μm.

FIG. 14B shows the experimental measurement of transmission in a 50 GHz ring filter with radius R=26 μm. The filter includes two SiN$_x$ rings at the FN and SN layers, both with widths of 1.1 μm, as illustrated in FIG. 12. The filter is coupled symmetrically from both sides by bus waveguides made from two SiN$_x$ waveguides of widths 1.1 μm at equal gap distances of 500 nm. The FSR of the ring is measured to be 8 nm at λ=1550 nm.

Two factors that affect operation of an erbium laser waveguide are the confinement factor in the gain medium and the overlap of the pump mode with the signal mode. An oxide gap in between the Er:Al$_2$O$_3$ and SiN$_x$ can be used to reduce the guiding effect of the relatively higher refractive index SiN$_x$. For a thicker nitride, the multi-segmented waveguide design can be used to further reduce the effective refractive index.

FIG. 15A shows a cross-sectional schematic of a multi-segmented waveguide for an Er:Al$_2$O$_3$ laser 1500. The waveguide comprises five segments (strips) 1510 of SiN$_x$ buried in a layer 1504 of SiO$_2$ (n=1.445), and a 200 nm SiO$_2$ gap 1512 between the top surface of the SiN$_x$ strips 1510 and a layer 1506 of Er:Al$_2$O$_3$. The SiN$_x$ strips 1510 have thicknesses t=200 nm and widths w=600 nm, the oxide gap is about g=400 nm, and the Er:Al$_2$O$_3$ film thickness is about 1500 nm.

FIGS. 15B and 15C show the intensity distributions for the pump wavelength at 980 nm and the signal wavelength at 1550 nm, respectively. The intensity distributions of the fundamental TE mode at different wavelengths were calculated by a finite difference mode solver. If the confinement factor ($\gamma$) and overlap factor ($\Gamma$) in the active medium are defined by:

$$\gamma_{s/p} = \frac{\int_A I_{s/p} \, dA}{\int_\infty I_{s/p} \, dA} = \frac{\sum_{active(ij)} I_{ij}^{(s/p)}}{\sum_{ij} I_{ij}^{(s/p)}}$$

$$\Gamma_{sp} = \frac{\int_A I_p I_s \, dA}{\sqrt{\int_A I_p^2 \, dA \int_A I_s^2 \, dA}} = \frac{\sum_{active(ij)} I_{ij}^{(p)} I_{ij}^{(s)}}{\sqrt{\sum_{active(ij)} I_{ij}^{2(p)}} \sqrt{\sum_{active(ij)} I_{ij}^{2(s)}}}$$

then the confinement factor at wavelengths of 1550 nm and 980 nm are 90% and 89%, respectively, and the overlap factor is about 99%.

Figures 16A, 16B:
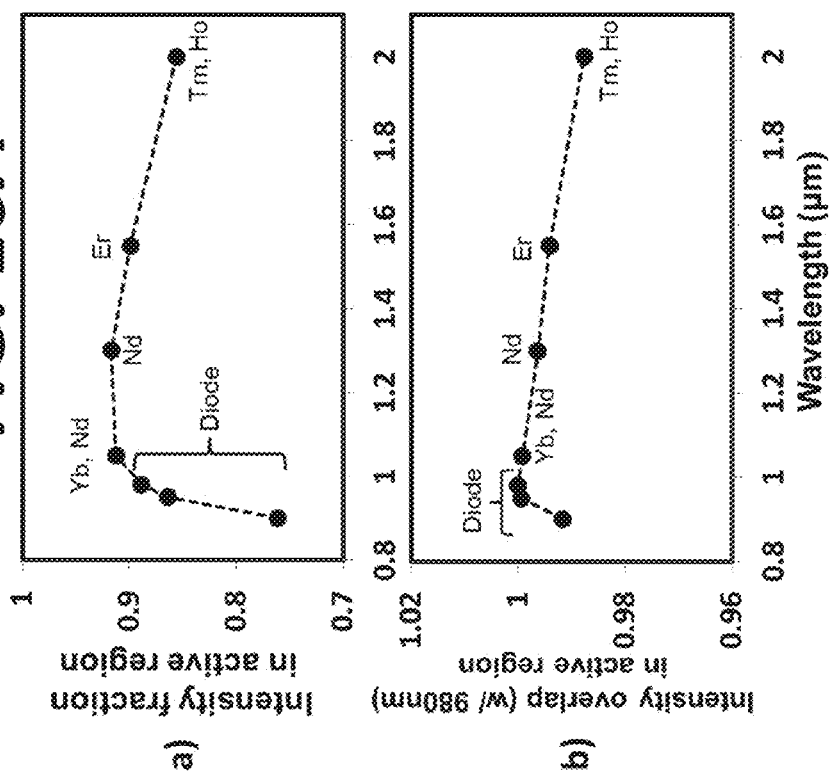
FIGS. 16A and 16B are plots of confinement and overlap factors (with 980 nm as the reference pump) as a function of wavelengths with points representing different types of lasers.

The same analysis of the multi-segmented structure applies to broader wavelength selections, including but not limited to: 950 nm and 980 nm (InGaAs pump diode), 1050 nm (Ytterbium/Yb and Neodymium/Nd doped laser), 1300 nm (Nd doped laser), 1550 nm (Er doped laser), and 2000 nm (Thulium/Tm and Holmium/Ho doped laser). The confinement and overlap factors (with 980 nm as the reference pump) of these wavelengths are shown in FIGS. 16A and 16B. The confinement factor is >85% for all wavelengths longer than 950 nm and >98% intensity overlap factor with 980 nm pump over the entire near-infrared wavelength light sources, demonstrating insensitivity of mode profiles at various wavelengths. The calculation neglects the variation of the refractive indices at various wavelengths.

In some cases, Er:Al$_2$O$_3$ lasers may include DBR and/or DFB resonators. Periods of both DBR and DFB are the same at $\Lambda$=504 nm. The DBR cavity includes a straight waveguide of length $L_{gain}$=13.8 mm defined by multiple silicon nitride segments and confined by two symmetric reflection gratings. Each grating is formed by periodic additional side pieces on both sides of the multi-segmented waveguide (adding to total of 7 SiN$_x$ segment waveguides), with each additional pieces having widths of $w_{DBR}$=600 nm and separated from the multi-segmented waveguide by a gap of $g_{DBR}$=400 nm. The total length of each of the gratings is given by $L_{DBR}$=5 mm. The DFB cavity includes a grating across the entire gain region, with the grating also formed by periodic additional side pieces with $w_{DFB}$=300 nm and $g_{DFB}$=550 nm. The total length of the DFB is $L_{DFB}$=20 mm. The quarter-wave phase shift of the DFB was designed to be slightly off from the center of the cavity (0.4 $L_{DFB}$) so as to ensure lasing out of a single facet. Using the prism coupling method to measure the planar losses around 1550 nm yields background loss, dopant concentration, and film thickness measurements of <0.1 dB/cm, 1.0×10$^{20}$ cm$^{-3}$, and 1.1 μm respectively. The confinement and overlap factors for 1.1 μm-thick Er:Al$_2$O$_3$ are given by $\gamma_{1550}$=79%, $\gamma_{980}$=73%, and $\Gamma_{980-1550}$=99% respectively.

The DBR and DFB lasers were pumped by using two 978 nm diode lasers. Transmission measurements yielded the coupling losses. For the DBR laser, the estimated maximum on-chip power was $P_{max}$=0.44 mW (−3.6 dBm) with a slope efficiency of η=1.4%. The threshold pump power is $P_{th}$=64 mW. For DFB laser, the estimated maximum on-chip power was $P_{max}$=0.18 mW (−7.3 dBm) and with a slope efficiency of η=2.7%. The threshold pump power is $P_{th}$=14 mW. FIGS. 17A and 17B show the spectrum and structure of the DBR and DFB lasers, respectively, at a wavelength of about 1565 nm.

Monolithic Rare-Earth-Doped Microring Lasers on Silicon Chips

Other embodiments include monolithic 160-μm-diameter rare-earth-doped microring lasers fabricated using silicon-compatible methods. Pump light injection and laser output coupling are achieved via an integrated silicon nitride waveguide. In some cases, the measured internal quality factors in undoped microrings are up to 3.8×10$^5$ at 980 nm and 5.7×10$^5$ at 1550 nm. Erbium- and ytterbium-doped microrings support single-mode 1.5-μm and 1.0-μm laser emission, respectively, and ytterbium laser efficiencies of up to 8%. Their small footprints, tens of microwatts output powers and sub-milliwatt thresholds introduces such rare-earth-doped microlasers as a scalable light source for silicon-based microphotonic devices and systems.

Figure 18A:
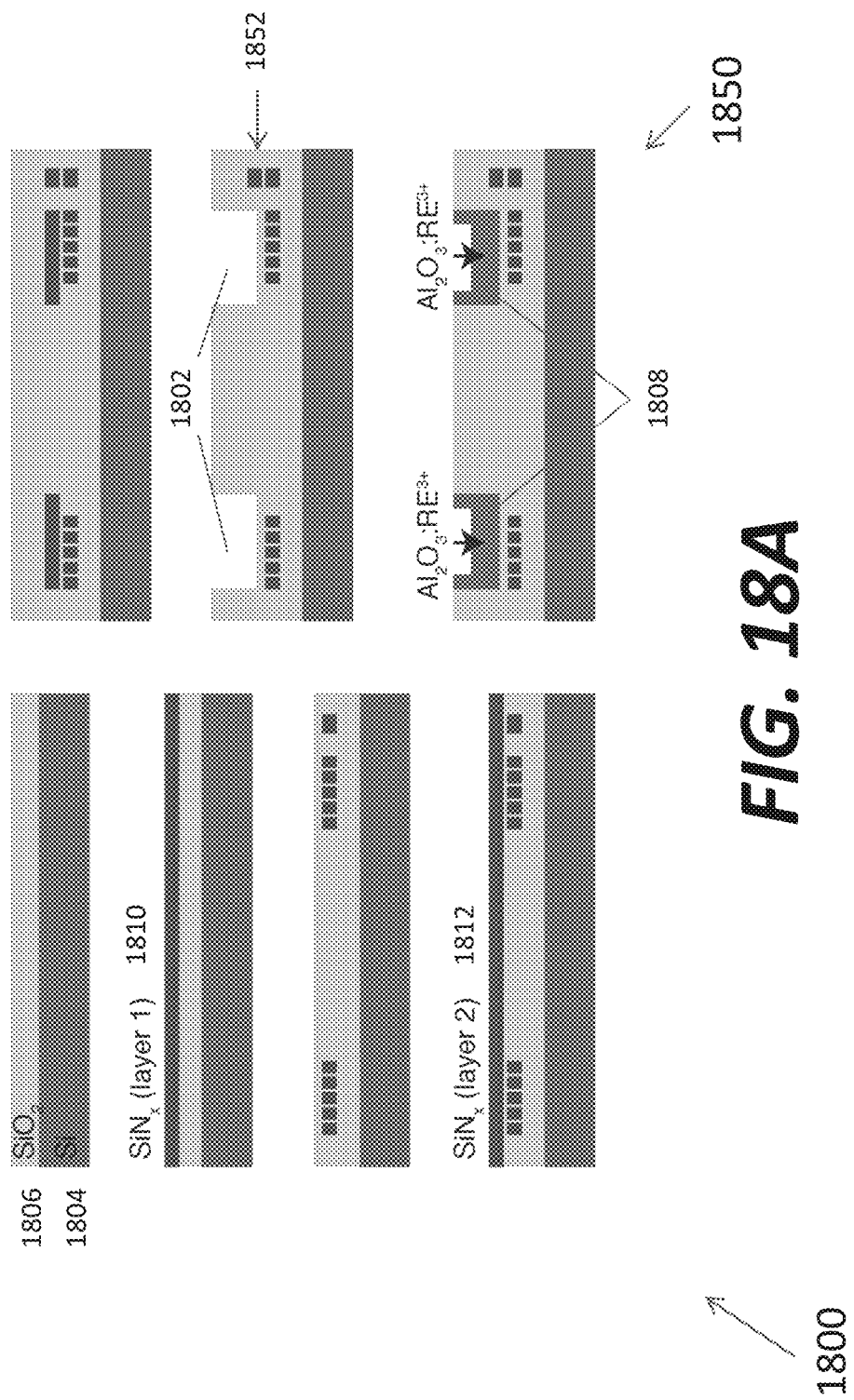
FIG. 18A illustrates a silicon-compatible, double silicon nitride (SiNx) layer photonics process flow.
Figure 18B:
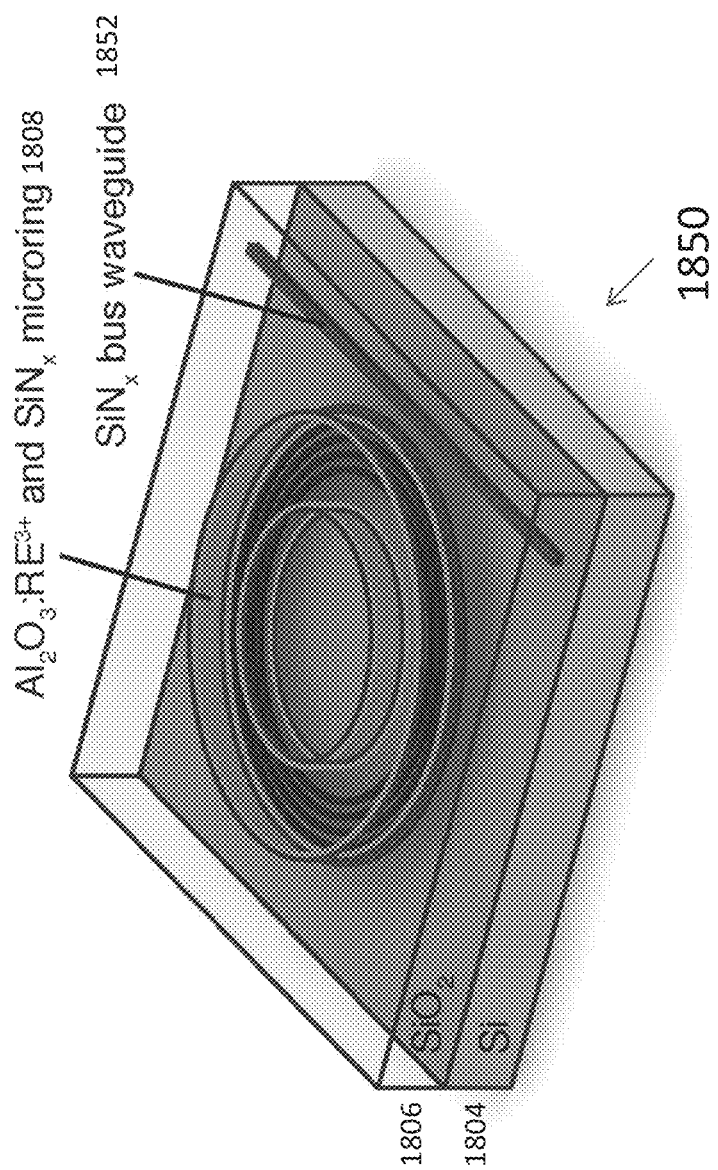
FIG. 18B shows a microring laser design fabricated using the process of FIG. 18A.

As shown in FIGS. 18A and 18B, an exemplary microring laser design is based on a silicon-compatible, double silicon nitride (SiN$_x$) layer photonics process flow 1800 (starting at top left, moving down the left-hand column, then moving down the right-hand column). SiN$_x$ has a higher refractive index than Al$_2$O$_3$:RE$^{3+}$ (n=2 vs. n=1.65), enabling more compact, high-refractive-index-contrast passive photonic devices. However, for lasers, a large proportion of light should propagate in the active medium. One way to provide increased propagation in the active medium is with a composite resonator structure which supports modes with large optical intensity overlap with the Al$_2$O$_3$:RE$^{3+}$ layer, but also permits reduced bend radius due to the SiN$_x$ features. The microring laser structures comprises five concentric silicon nitride microrings below an Al$_2$O$_3$:RE$^{3+}$-filled trench adjacent to a double-layer SiN$_x$ bus waveguide. The trench enables both silicon compatibility (the Al$_2$O$_3$:RE$^{3+}$ can be deposited into the trenches outside of the silicon foundry) and also serves to confine the light and reduce the bending radius. The segmented silicon nitride design reduces the wavelength sensitivity of the mode shape, allowing for high overlap between 980-nm pump modes and 1050-nm Yb- or 1550-nm Er-doped microring laser modes. Meanwhile, using a thick, double-layer silicon nitride bus waveguide allows for a wider range of effective indices and better control of coupling of pump and laser light to and from the microring.

The silicon-based microring chips can be fabricated using a 300-mm CMOS foundry with a 65-nm technology node. A 6-μm-thick SiO$_2$ cladding layer 1806 is deposited on a 300-mm silicon wafer 1804, followed by deposition and patterning of two 240-nm-thick SiN$_x$ (n=1.94 at 1550 nm) layers 1810 and 1812 with a 100-nm-thick SiO$_2$ layer in between. The SiO$_2$ and SiN$_x$ layers were grown using plasma-enhanced chemical-vapor deposition and surface-polished after deposition to reduce optical scattering losses. Both SiN$_x$ layers 1810 and 1812 were patterned using 193-nm immersion lithography and reactive ion etching. A 4-μm-thick SiO$_2$ layer is deposited on the top SiN$_x$ level 1812, then patterned and etched to form 4-μm-deep microring trenches 1802 using the upper $SiN_x$ layer 1812 as an etch stop. After removal of the $SiN_x$ etch-stop 1812, an additional 100 nm $SiO_2$ thickness is deposited within the microring trenches. Next, deep trenches were etched at the edge of the chips for dicing and fiber end-coupling, and the wafers were transferred from the silicon foundry. Lastly, the wafers were diced into individual dies and 2-μm-thick undoped and rare-earth-doped aluminum oxide films 1808 were deposited into the microring trenches using a reactive co-sputtering process similar to that described in. The resulting structure 1850, which includes a waveguide 1852 resonantly coupled to the erbium-doped microring, is illustrated in FIG. 18B.

The ytterbium-doped lasers have a uniform doping profile with a doping concentration of $7 \times 10^{20}$ $cm^{-3}$ because of the low absorption-to-emission cross-section ratio around 1050 nm and negligible concentration-quenching effects observed in $Al_2O_3$:$Yb^{3+}$. Moreover, higher gain was required to overcome the higher internal resonator scattering losses near 1 μm and output coupling as compared to erbium-doped devices operating near 1.5 μm. In order to realize erbium-doped microring lasers, the peak erbium concentrations were selected to be on the order of 2 to $3 \times 10^{20}$—high enough to achieve higher gain than cavity losses, but low enough to maintain low threshold lasing and avoid significant concentration quenching mechanisms. For the erbium-doped films, the sputtering power applied to the erbium target was varied throughout the deposition, resulting in uniform lateral doping and a graded vertical concentration profile (with peak in the center of the film and approximately ⅓ the peak concentration at the top and bottom of the film). The erbium concentration was varied throughout the layer in order to match the 980-nm pump mode distribution and further reduce the laser threshold.

Figure 19A:
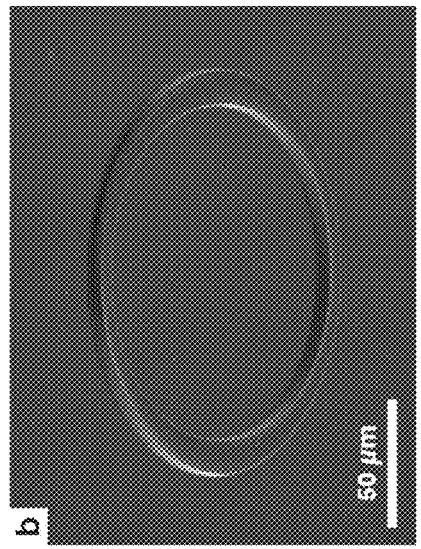
FIG. 19A shows a monolithic laser structure that includes a silicon nitride bus waveguide below a microring.
Figure 19B:
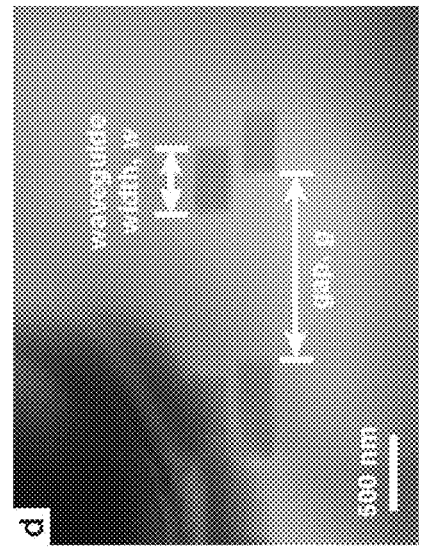
FIG. 19B shows a top view scanning electron microscope (SEM) image of the microring trench structure on the silicon chip shown in FIG. 19A.
Figure 19C:
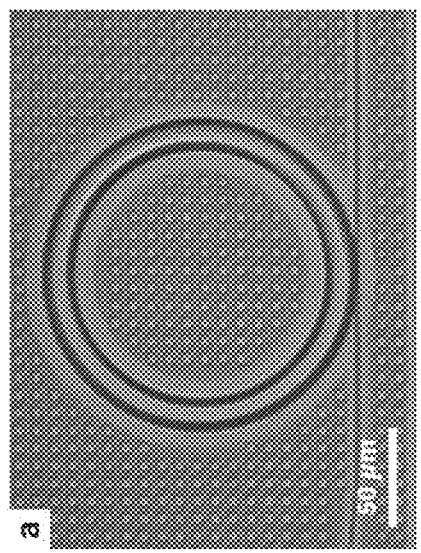
FIG. 19C shows a focus-ion-beam-milled cross-section of the microring at the edge of the trench shown in FIG. 19A.
Figure 19D:
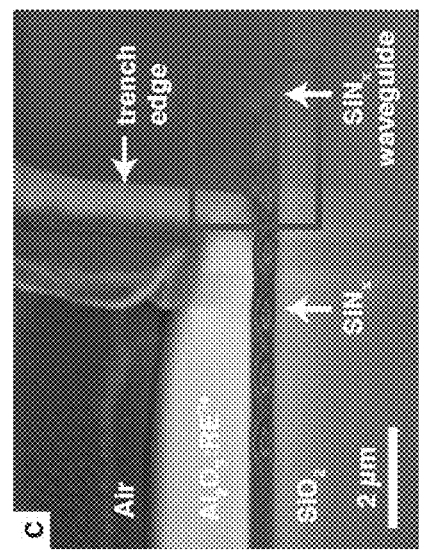
FIG. 19D displays a close-up image of the coupling region (as indicated by the box at lower right in FIG. 19C), showing the silicon nitride microring and bus waveguide features, coupling gap, g, and a waveguide width, w, of 400 nm.

FIGS. 19A-19D show images of exemplary fabricated devices. The monolithic laser structure is displayed in FIG. 19A, with the silicon nitride bus waveguide visible below the microring. FIG. 19B shows a top view scanning electron microscope (SEM) image of the microring trench structure on the silicon chip. FIG. 19C shows a focus-ion-beam-milled cross-section of the microring at the edge of the trench. The $Al_2O_3$:$RE^{3+}$ layer is visible on the bottom of the trench as well as a thinner $Al_2O_3$:$RE^{3+}$ layer on the trench sidewall due to the conformal sputtering process. FIG. 19D displays a close-up image of the coupling region (as indicated by the red box in FIG. 19C), showing the silicon nitride microring and bus waveguide features, coupling gap, g, and a waveguide width, w, of 400 nm. Visible in the image are a slight offset between the top and bottom silicon nitride waveguide layers, as well as residual $SiN_x$ etch stop material at the edge of the trench, both of which were within the design tolerance.

Transmission measurements in undoped microrings and laser measurements using a fiber end-coupling setup demonstrate the devices' performance. For passive measurements, light from a fiber-coupled 960-990-nm tunable laser (<200 kHz linewidth, 1-pm minimum step size) or 1460-1630-nm tunable laser source (100 kHz linewidth, 0.1-pm minimum step size) was coupled through a polarization controller and end-coupled to the chip via a single-mode 980-nm (SM980) cleaved fiber. Light was coupled from the chip using another SM980 cleaved fiber, and the transmitted optical power was measured using an InGaAs detector. For laser measurements, on the input side, pump light from the 960-990 nm tunable laser source or a 976-nm diode laser (1-nm linewidth) was coupled to a polarization controller, followed by a 980-nm variable-optical attenuator (VOA), a 99%/1% tap and a 980/1050 nm (Yb-doped microring lasers) or 980/1550 nm (Er-doped microring lasers) fiber-based wavelength division multiplexer (WDM). The light was coupled to and from the chip using SM980 bare fibers and coupled the output fiber to another fiber WDM to separate the residual pump and laser light. The incident pump power was adjusted and monitored using the VOA and output from the 1% branch of the tap, respectively. The laser output powers and optical intensity spectra was measured by coupling the 1050 or 1550 nm branch of the WDM from each side of the chip to an optical spectrum analyzer (600-1700 nm, 20-μm resolution). Time domain measurements were carried out by coupling the laser output to an amplified 10-MHz photodetector connected to an oscilloscope.

Figure 20:
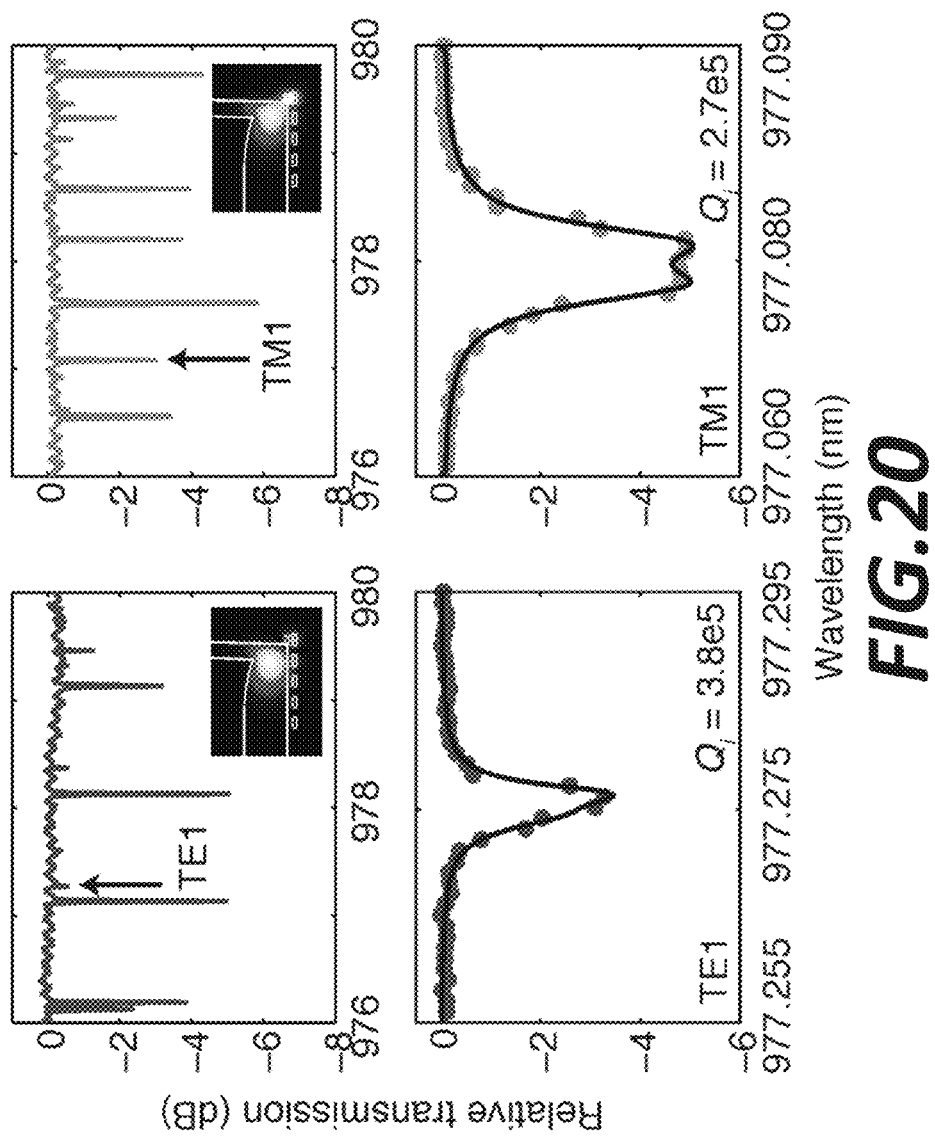
FIG. 20 shows 980-nm transmission measurements for a micro-ring device with w=400 nm and g=700 nm and both TE and TM polarizations (left and right, respectively).
Figure 21:
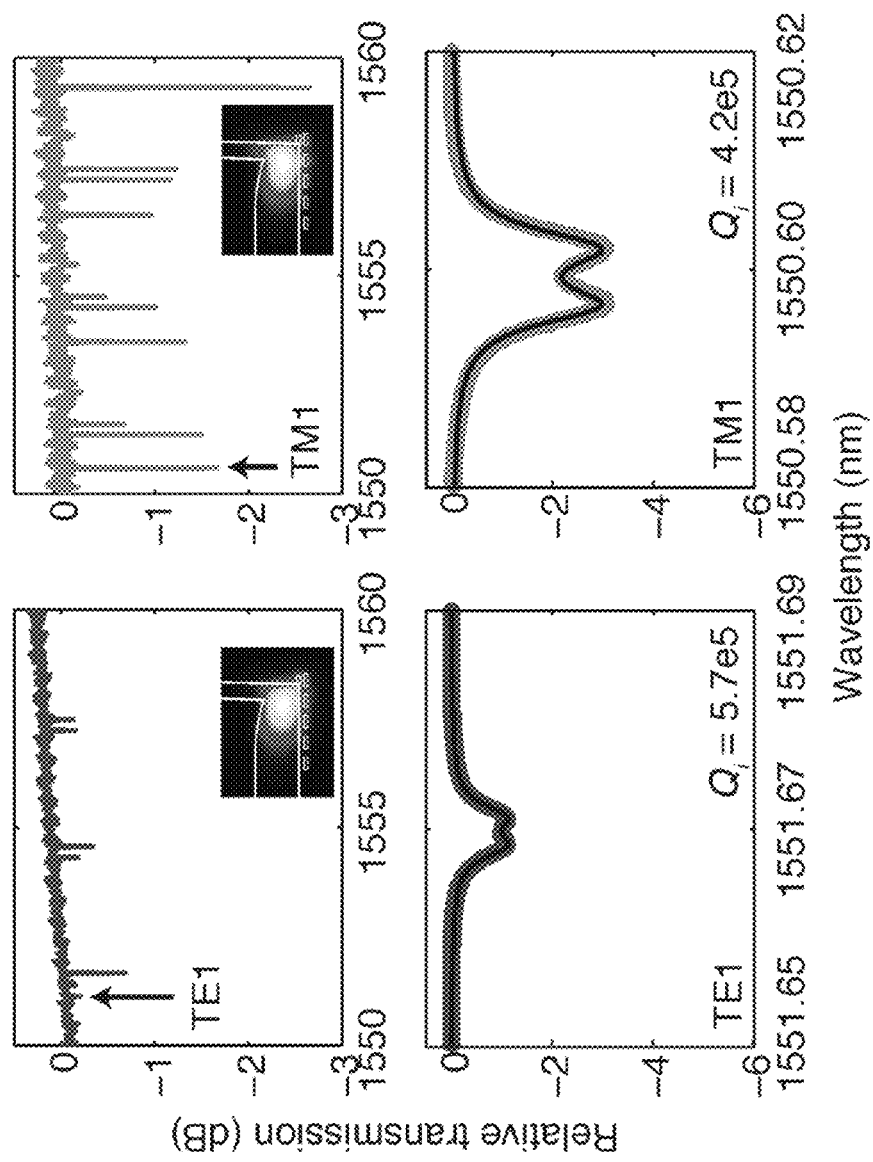
FIG. 21 shows 1550-nm transmission measurements in micro-ring structures with w=900 nm (phase matched to the 1550-nm resonator modes) and g=1000 nm.

FIGS. 20 and 21 summarize 980-nm and 1550-nm transmission measurements carried out in undoped microrings. FIG. 20, top, shows 980-nm transmission measurements for a device with w=400 nm and g=700 nm and both TE and TM polarizations (left and right, respectively). The insets show the intensity profiles of the optimum pump modes (TE1 and TM1) calculated using a finite element mode solver, with their resonances indicated on the plots. Their resonances were differentiated from those of the lowest order TE and TM modes (TE0 and TM0, which calculations show are strongly confined in the $SiN_x$ layer) and higher-order, lossier modes by their free-spectral ranges, 1.10 and 1.12 nm, respectively. Fitting the transmission responses of the under-coupled resonator using a Lorentzian function (FIG. 20, bottom) yields internal quality factors, $Q_i$, of $3.8 \times 10^5$ and $2.7 \times 10^5$ (TE1 and TM1, respectively). These $Q_i$ correspond to propagation losses per unit length of 1.3 and 1.8 dB/cm in the cavity.

FIG. 21 (top) shows 1550-nm transmission measurements in similar ring structures with w=900 nm (phase matched to the 1550-nm resonator modes) and g=1000 nm. The inset images show the calculated intensity profiles of the TE1 and TM1 modes. Fitting to the resonances yields $Q_i$ on the order of $5.7 \times 10^5$ and $4.2 \times 10^5$ for TE and TM polarization. These quality factors correspond to propagation losses of 0.5 and 0.7 dB/cm. Given the peak gain coefficients of 2.0 dB/cm at 1530 nm and 2.5 dB/cm at 1020 nm measured previously in Er- and Yb-doped $Al_2O_3$ waveguides, such passive resonator losses can be considered sufficiently low for obtaining round-trip net gain in similar rare-earth-doped microrings.

Figure 22:
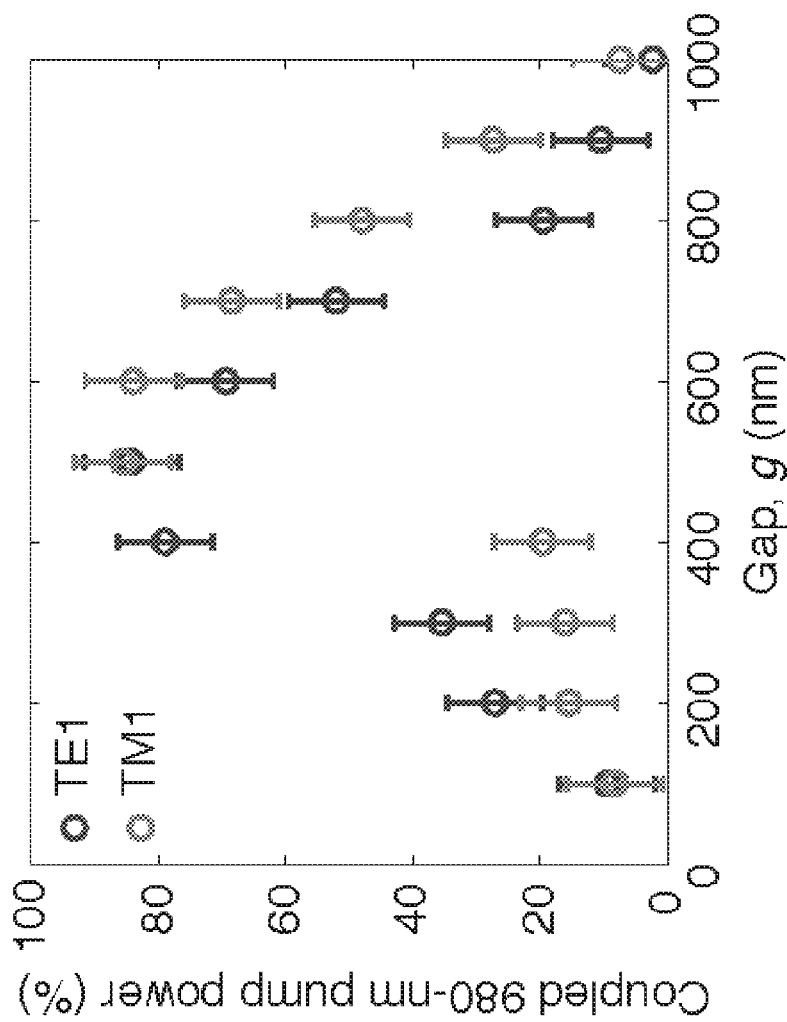
FIG. 22 shows pump coupling measurements for the TE1 and TM1 modes in undoped microrings.

In some cases, rare-earth-doped laser devices may include a bus waveguide width of 400 nm in order to phase-match the 980-nm waveguide pump mode to the resonator pump mode and achieve strong pump coupling to the microring. FIG. 22 shows pump coupling measurements for the TE1 and TM1 modes in the undoped microrings. For both polarizations, optimum coupling occurs near g=500 nm, where the internal quality factor of the resonator, $Q_i$, matched the external quality factor, $Q_e$.

Figure 23B:
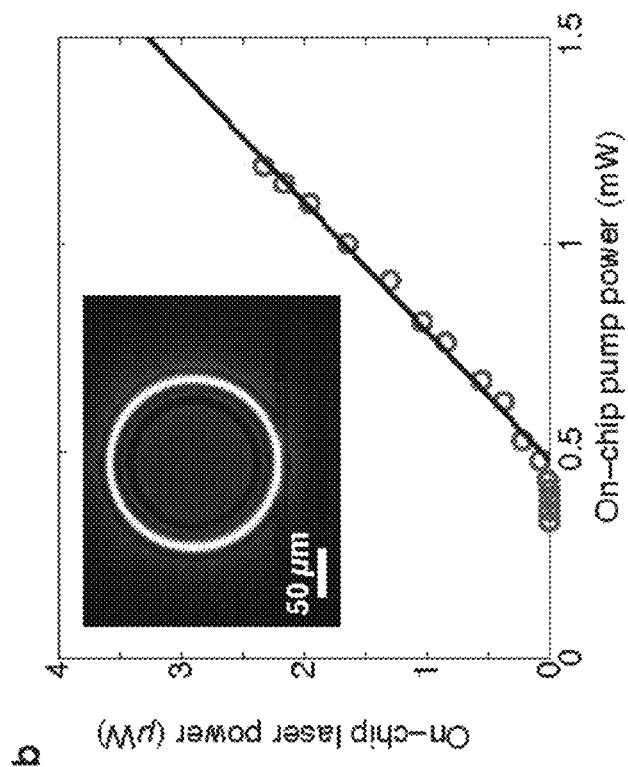
FIG. 23B shows the laser power curve of the micro-ring device of FIG. 23A.
Figure 23A:
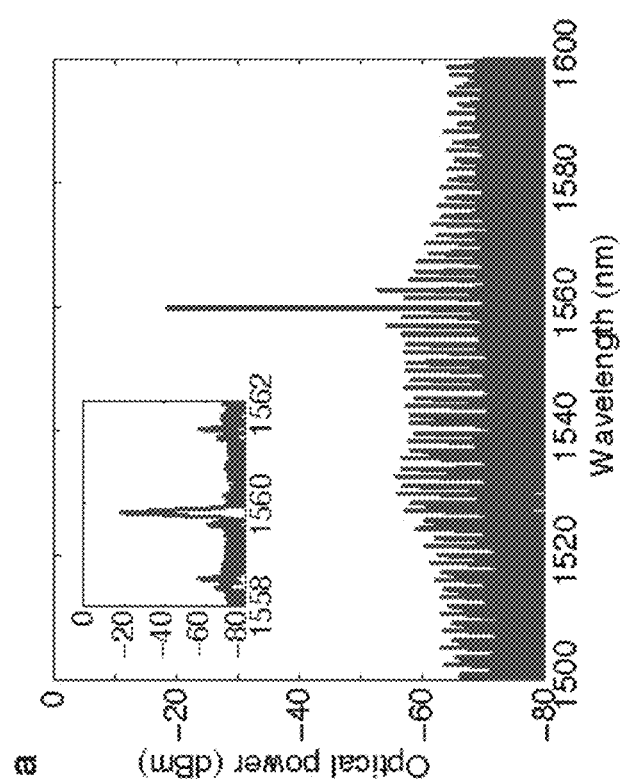
FIG. 23A is an emission spectrum of a micro-ring device with an erbium doping concentration of 2×10$^{20}$ cm$^{-3}$ and g=500 nm measured under resonant pumping at 978.84 nm.

FIGS. 23A and 23B summarize typical Er-doped microring laser measurements. As shown in FIG. 23A, for a device with peak Er concentration, $N_{Er,peak}$, of $3 \times 10^{20}$ $cm^{-3}$ and g=300 nm, single-mode lasing occurs at 1559.82 nm (with side-mode suppression>30 dB) with up to 27-μW total laser power in the silicon nitride waveguide. In various devices, the laser modes may span a wavelength range of 1530-1565 nm and lase in both multi-mode and single-mode operation. Typically the laser spectrum was multi-mode at low pump powers, such as the maximum power obtainable with the tunable laser, while one or two modes became dominant under higher power 976-nm diode laser pumping (as shown in the figure). By comparing to the resonances observed in 1550-nm transmission measurements in the same chips, the laser modes tended to be TM-like. The free-space –3 dB linewidth was <20 pm (below the limit of the optical spectrum analyzer used to measure the laser spectrum). The lowest threshold devices were obtained for gaps near 500 nm (at optimum pump coupling) and lower erbium concentrations. FIG. 23B shows the laser power curve of a device with $N_{Er}=2\times10^{20}$ cm$^{-3}$ and g=500 nm measured under resonant pumping at 978.84 nm. The laser exhibits a threshold of 0.5 mW, and double-sided slope efficiency of 0.3%, with up to 2.4 μW output power coupled into the SiN$_x$ waveguide. Time-domain measurements revealed that the lasers operated in a pulsed mode at frequencies on the order of 1 MHz, which is typical of erbium lasers.

Figures 24A, 24B:
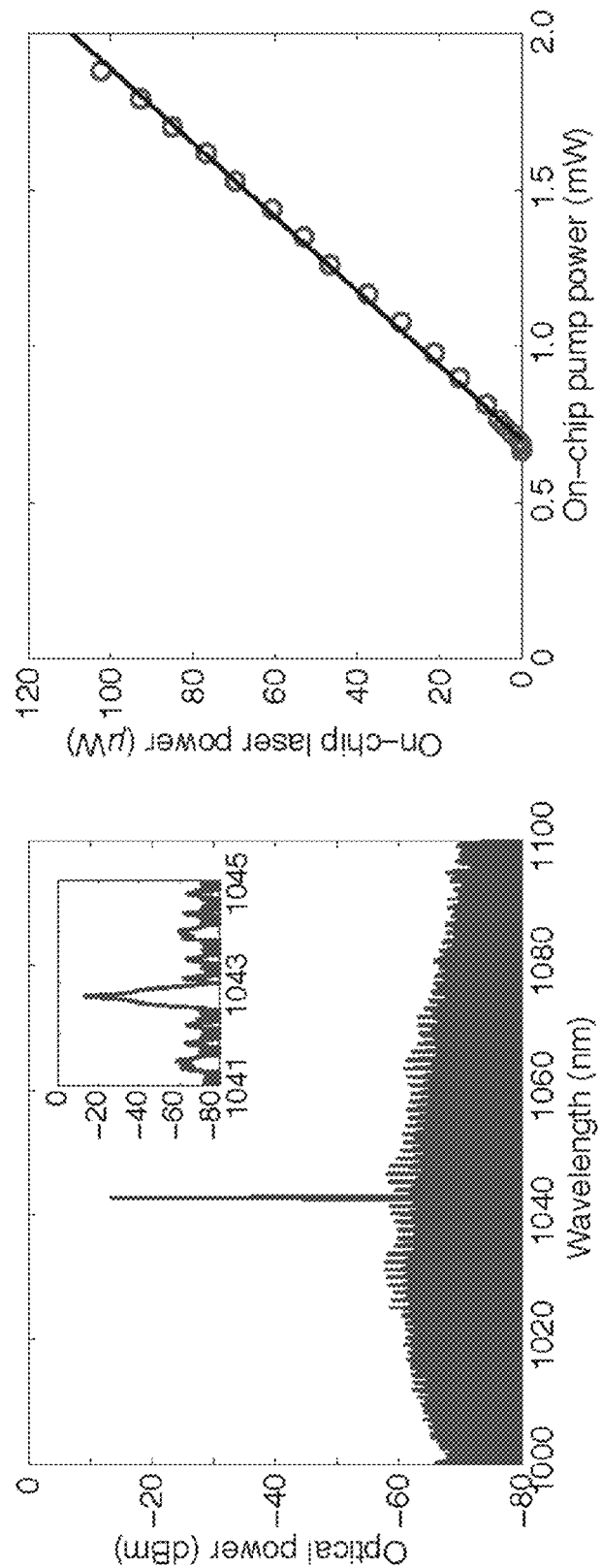
FIG. 24A shows a measured emission spectrum of a typical Yb-doped microring laser for g=400 nm.
FIG. 24B shows a laser power curve of a typical Yb-doped microring laser for g=400 nm.

FIG. 24 displays typical Yb-doped microring laser measurements, obtained for g=400 nm. When tuned onto the TM-like resonance, the optimum pump wavelength is about 970.96 nm. The laser spectrum is displayed in FIG. 24A. A single laser line is evident at 1042.74 nm with a side-mode suppression of >40 dB (inset). The laser power curve is shown in FIG. 24B. Lasing occurs at a threshold of 0.7 mW, a total output power of >100 μW coupled into the SiN$_x$ waveguide and double-sided slope efficiency of 8.4%. Adjusting the gap, pump wavelength, and polarization yields lasing on multiple TE- and TM-like modes and at wavelengths in the range 1020-1045 nm. As with the erbium-doped microring lasers, pulsing behavior at pump powers occurs close to threshold, with pulse frequencies up to 2 MHz. However, with increasing pump power suppresses the pulsing behavior and yields continuous-wave, single-mode lasing.

These examples of monolithic rare-earth-doped lasers have much smaller sizes and thresholds than other monolithic rare-earth-doped lasers. Previously, the smallest bend radius obtained in $Al_2O_3$:$Er^{3+}$ devices embedded in $SiO_2$ was 250 μm. Here, using SiN$_x$ features reduces the bend radius to 80 μm. Compared to previous $Al_2O_3$:$Er^{3+}$ racetrack lasers, the device footprint has been decreased by a factor of approximately 500. In addition, exemplary devices show single-mode operation, which is much more easily obtained in such a smaller resonator structure. Meanwhile, the total cavity length of the microrings is approximately 20 times shorter than that of the DFB and DBR devices, and the thresholds reported here are at least an order of magnitude smaller. Optimization of the microring structure and waveguide-microring coupling may enable lower thresholds and higher efficiencies. Likewise, continuous-wave operation of similar erbium-doped lasers can be achieved by injecting higher pump powers or by adjusting the $Al_2O_3$:$Er^{3+}$ layer thickness and doping concentration. In addition, Er—Yb co-doping can be explored.

By using standard silicon wafer-scale processing, these microring lasers can easily be included in a full multi-level silicon photonic chip fabrication flow. Numerous lasers could be powered by a single off-chip fiber-coupled pump laser or heterogeneously-bonded on-chip laser diode pump source. Due to their low threshold and single-mode operation, arrays of Er-doped lasers could function as multi-wavelengths communications sources. Meanwhile, Yb-doped lasers can operate and emit in the low water absorption window and can act as highly effective nanoparticle sensors. Thus, their implementation in lab-on-a-chip or integrated biophotonic applications is of interest. Furthermore, the reported cavity structure can easily be adapted for additional rare earth dopants ($Nd^{3+}$, $Tm^{3+}$, etc.) with different pump and laser wavelengths.

CONCLUSION

In summary, embodiments of the present invention include integrated erbium-doped aluminum oxide lasers with DBR cavities defined in SiN$_x$ layers. The laser cavity can be defined using 193 nm immersion lithography within a standard CMOS foundry, with inverted ridge waveguides (silicon nitride strips) enabling an erbium-doped aluminum oxide layer to be deposited as a final backend-processing step. The waveguide structure has a high confinement factor in the active medium at both the 980 nm pump wavelength (89%) and the 1550 nm laser emission wavelength (87%), with an intensity overlap of more than 93%. Maximum output power of 2.5 mW, 5.1 mW, and 0.5 mW are obtained from DBR cavities at center wavelength at 1536 nm, 1561 nm, 1596 nm, respectively. These laser wavelengths lie within both the C- and L-bands of the erbium gain spectrum. Advantages of this approach include robust, high-resolution, wafer-scale silicon nitride structuring and back-end deposition of the erbium-doped aluminum oxide layer. More complex structures such as distributed feedback Bragg cavities can be directly patterned in the silicon nitride layer. Furthermore, these structures can be mass produced and integrated with other silicon photonic devices in a standard CMOS foundry.

While various inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

The above-described embodiments can be implemented in any of numerous ways. For example, embodiments of designing and making the coupling structures and diffractive optical elements disclosed herein may be implemented using hardware, software or a combination thereof. When implemented in software, the software code can be executed on any suitable processor or collection of processors, whether provided in a single computer or distributed among multiple computers.

Further, it should be appreciated that a computer may be embodied in any of a number of forms, such as a rack-mounted computer, a desktop computer, a laptop computer, or a tablet computer. Additionally, a computer may be embedded in a device not generally regarded as a computer but with suitable processing capabilities, including a Personal Digital Assistant (PDA), a smart phone or any other suitable portable or fixed electronic device.

Also, a computer may have one or more input and output devices. These devices can be used, among other things, to present a user interface. Examples of output devices that can be used to provide a user interface include printers or display screens for visual presentation of output and speakers or other sound generating devices for audible presentation of output. Examples of input devices that can be used for a user interface include keyboards, and pointing devices, such as mice, touch pads, and digitizing tablets. As another example, a computer may receive input information through speech recognition or in other audible format.

Such computers may be interconnected by one or more networks in any suitable form, including a local area network or a wide area network, such as an enterprise network, and intelligent network (IN) or the Internet. Such networks may be based on any suitable technology and may operate according to any suitable protocol and may include wireless networks, wired networks or fiber optic networks.

The various methods or processes (e.g., of designing and making the coupling structures and diffractive optical elements disclosed above) outlined herein may be coded as software that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine.

In this respect, various inventive concepts may be embodied as a computer readable storage medium (or multiple computer readable storage media) (e.g., a computer memory, one or more floppy discs, compact discs, optical discs, magnetic tapes, flash memories, circuit configurations in Field Programmable Gate Arrays or other semiconductor devices, or other non-transitory medium or tangible computer storage medium) encoded with one or more programs that, when executed on one or more computers or other processors, perform methods that implement the various embodiments of the invention discussed above. The computer readable medium or media can be transportable, such that the program or programs stored thereon can be loaded onto one or more different computers or other processors to implement various aspects of the present invention as discussed above.

The terms "program" or "software" are used herein in a generic sense to refer to any type of computer code or set of computer-executable instructions that can be employed to program a computer or other processor to implement various aspects of embodiments as discussed above. Additionally, it should be appreciated that according to one aspect, one or more computer programs that when executed perform methods of the present invention need not reside on a single computer or processor, but may be distributed in a modular fashion amongst a number of different computers or processors to implement various aspects of the present invention.

Computer-executable instructions may be in many forms, such as program modules, executed by one or more computers or other devices. Generally, program modules include routines, programs, objects, components, data structures, etc. that perform particular tasks or implement particular abstract data types. Typically the functionality of the program modules may be combined or distributed as desired in various embodiments.

Also, data structures may be stored in computer-readable media in any suitable form. For simplicity of illustration, data structures may be shown to have fields that are related through location in the data structure. Such relationships may likewise be achieved by assigning storage for the fields with locations in a computer-readable medium that convey relationship between the fields. However, any suitable mechanism may be used to establish a relationship between information in fields of a data structure, including through the use of pointers, tags or other mechanisms that establish relationship between data elements.

Also, various inventive concepts may be embodied as one or more methods, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

The invention claimed is:

1. A photonic device comprising:
   a substrate;
   a dielectric layer, disposed on the substrate, having a first refractive index;
   at least one dielectric strip, disposed within the dielectric layer, having a second refractive index greater than the first refractive index; and
   a gain layer, disposed in contact with the dielectric layer, having a third refractive index greater than the first refractive index to guide an optical pump beam and an optical signal beam in a propagation direction parallel to a longitudinal axis of the at least one dielectric strip so as to amplify the optical signal beam via stimulated emission,
   wherein a majority of the optical pump beam is confined within the gain layer.

2. The photonic device of claim 1, wherein:
   the substrate comprises at least one of silicon, silicon-on-insulator, and glass;
   the dielectric layer comprises silicon dioxide;
   the at least one dielectric strip comprises silicon nitride; and
   the gain layer comprises $Al_2O_3:Er^{3+}$.

3. The photonic device of claim 1, wherein the optical pump beam has a wavelength of $\lambda_p$ and the at least one dielectric strip is disposed a distance of about $\lambda_p/4$ to about $20\lambda_p$ from a boundary between the dielectric layer and the gain layer.

4. The photonic device of claim 1, wherein the gain layer has a thickness of about $\lambda_p/10$ to about $10\lambda_p$.

5. The photonic device of claim 4, wherein the at least one dielectric strip comprises a plurality of dielectric strips, disposed within the dielectric layer between the substrate and the gain layer, to confine the optical pump beam within the gain layer in a direction orthogonal to the propagation direction.

6. The photonic device of claim 5, wherein the plurality of dielectric strips comprises a first dielectric strip having at least one tapered section to couple energy from at least one of the optical pump beam and the optical signal beam from a first region in the gain layer above the first dielectric strip to a second region in the gain layer above a second dielectric strip in the plurality of dielectric strips.

7. The photonic device of claim 5, wherein the plurality of dielectric strips comprises a first strip having at least one curved section to guide at least one of the optical pump beam and the optical signal beam along a curved path within the gain layer.

8. The photonic device of claim 1, wherein the second refractive index is greater than the third refractive index.

9. The photonic device of claim 1, wherein the dielectric strip comprises:
   at least one grating to reflect at least a portion of the optical signal beam.

10. The photonic device of claim 9, wherein the at least one grating at least partially defines a laser cavity in the gain layer at a wavelength of the optical signal beam.

11. A photonic device comprising:
    a substrate;
    a dielectric layer, disposed on the substrate, having a first refractive index;
    at least one dielectric strip, disposed within the dielectric layer, having a second refractive index greater than the first refractive index; and
    a gain layer, disposed in contact with the dielectric layer and having a third refractive index greater than the first refractive index, to guide an optical pump beam and an optical signal beam so as to amplify the optical signal beam via stimulated emission,
    wherein the optical pump beam has a wavelength of $\lambda_p$ and the at least one dielectric strip is disposed a distance of at least $\lambda_p/4$ from a boundary between the dielectric layer and the gain layer.

* * * * *